United States Patent
Wakabayashi et al.

(10) Patent No.: US 10,753,738 B2
(45) Date of Patent: Aug. 25, 2020

(54) ROBOT SYSTEM

(71) Applicant: Seiko Epson Corporation, Tokyo (JP)

(72) Inventors: Shuichi Wakabayashi, Okaya (JP); Makiko Hino, Matsumoto (JP); Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 141 days.

(21) Appl. No.: 16/140,744

(22) Filed: Sep. 25, 2018

(65) Prior Publication Data

US 2019/0094017 A1 Mar. 28, 2019

(30) Foreign Application Priority Data

Sep. 27, 2017 (JP) ................................. 2017-186529

(51) Int. Cl.
*G01B 11/25* (2006.01)
*B25J 19/02* (2006.01)
(Continued)

(52) U.S. Cl.
CPC .......... *G01B 11/254* (2013.01); *B25J 9/1697* (2013.01); *B25J 13/087* (2013.01); *B25J 19/022* (2013.01);
(Continued)

(58) Field of Classification Search
CPC ... G01B 11/254; G01B 11/25; G01B 11/2504; G01B 11/2513; G01B 11/2527;
(Continued)

(56) References Cited

U.S. PATENT DOCUMENTS 6,665,588 B2 * 12/2003 Watanabe ................ B23Q 7/04
414/796.5
7,151,848 B1 * 12/2006 Watanabe .............. B25J 9/1656
382/141
(Continued)

FOREIGN PATENT DOCUMENTS

| EP | 0812662 A1 | 12/1997 |
| JP | 2014-089062 A | 5/2014 |
| WO | WO-2006-043396 A1 | 4/2006 |

OTHER PUBLICATIONS

Extended European Search Report for Patent Application No. EP18196510 dated Apr. 16, 2019 (9 pages).

*Primary Examiner* — Michael S Osinski
(74) *Attorney, Agent, or Firm* — Harness, Dickey & Pierce, P.L.C.

(57) ABSTRACT

A robot system including: one or two robot arms which perform work on a target; a shape measurement device which is disposed on the robot arm and measures a shape of the target; and a controller which controls the robot arm based on the shape measurement device, in which the shape measurement device includes a projection device which projects striped pattern light onto the target, an image capturing unit which captures the image of the pattern light, and a processor which calculates the shape of the target based on the captured image by the image capturing device, and in which the projection device includes a light source device which emits linear laser, an optical scanner which generates the pattern light by reflecting the laser from the light source device and by scanning the target, and a scanner driver which outputs a driving signal to drive the optical scanner non-resonantly.

10 Claims, 16 Drawing Sheets

(51) Int. Cl.
  *B25J 13/08* (2006.01)
  *B25J 9/16* (2006.01)
  *G05B 19/401* (2006.01)

(52) U.S. Cl.
  CPC .. *G05B 19/401* (2013.01); *G05B 2219/37555* (2013.01); *G05B 2219/37571* (2013.01); *G05B 2219/40564* (2013.01)

(58) Field of Classification Search
  CPC ..... G01B 11/2545; G01B 11/02; G01B 11/14; G01B 11/026; B25J 9/1697; B25J 9/1692; B25J 9/1612; B25J 9/10; B25J 9/1664; B25J 9/0084; B25J 13/087; B25J 19/022–023; G05B 19/401; G06T 7/521; G06T 7/55; G06T 7/75; G06T 7/80; Y10S 901/47; Y10S 901/01; G06K 9/00201; G06K 9/4661
  See application file for complete search history.

(56) References Cited

U.S. PATENT DOCUMENTS

| | | | | |
|---|---|---|---|---|
| 7,724,379 | B2* | 5/2010 | Kawasaki | G01B 11/2509 356/603 |
| 7,957,583 | B2* | 6/2011 | Boca | B25J 9/1697 345/419 |
| 8,095,237 | B2* | 1/2012 | Habibi | B25J 9/1692 700/245 |
| 8,437,535 | B2* | 5/2013 | Boca | G01S 17/875 382/154 |
| 8,712,678 | B2* | 4/2014 | Takahashi | B60G 15/068 700/112 |
| 9,050,728 | B2* | 6/2015 | Ban | B25J 9/1697 |
| 9,393,696 | B2* | 7/2016 | Hayashi | B25J 9/1697 |
| 9,492,923 | B2* | 11/2016 | Wellman | B25J 9/1612 |
| 9,630,321 | B2* | 4/2017 | Bradski | G06T 7/529 |
| 10,020,216 | B1* | 7/2018 | Fujimori | G01B 11/14 |
| 10,190,873 | B1* | 1/2019 | Yamagami | G01B 11/02 |
| 10,302,422 | B2* | 5/2019 | Inukai | B25J 9/1612 |
| 10,527,409 | B2* | 1/2020 | Yamauchi | G01B 11/25 |
| 10,569,421 | B2* | 2/2020 | Shino | G01D 5/24457 |
| 2005/0253055 | A1 | 11/2005 | Sprague et al. | |
| 2007/0115484 | A1* | 5/2007 | Huang | G01B 11/2527 356/604 |
| 2008/0069435 | A1* | 3/2008 | Boca | G01B 11/25 382/153 |
| 2008/0161970 | A1 | 7/2008 | Adachi et al. | |
| 2009/0097039 | A1* | 4/2009 | Kawasaki | G01B 11/2509 356/603 |
| 2011/0043808 | A1* | 2/2011 | Isozaki | G01B 11/0608 356/445 |
| 2012/0113435 | A1* | 5/2012 | Suzuki | G01B 11/2518 356/612 |
| 2014/0104416 | A1* | 4/2014 | Giordano | G01B 11/02 348/135 |
| 2014/0268108 | A1* | 9/2014 | Grau | G01B 5/008 356/72 |
| 2015/0077823 | A1* | 3/2015 | Hashiguchi | G02B 26/101 359/200.8 |
| 2015/0146215 | A1* | 5/2015 | Kobayashi | G01B 11/2504 356/610 |
| 2015/0271466 | A1* | 9/2015 | Yamazaki | G06K 9/4661 348/46 |
| 2016/0034746 | A1 | 2/2016 | Harada et al. | |
| 2017/0151672 | A1* | 6/2017 | Ando | G06T 7/75 |
| 2017/0211927 | A1 | 7/2017 | Bridges et al. | |
| 2018/0315205 | A1* | 11/2018 | Moribe | G01B 11/2504 |
| 2019/0077013 | A1* | 3/2019 | Yoshida | B25J 9/10 |
| 2019/0389065 | A1* | 12/2019 | Horiguchi | B25J 19/06 |
| 2019/0389068 | A1* | 12/2019 | Shimizu | B25J 11/005 |

* cited by examiner

ROBOT SYSTEM

BACKGROUND

1. Technical Field

The present invention relates to a robot system.

2. Related Art

As a robot system which performs work with respect to a target using a robot having a robot arm, a system in which a device for measuring the shape of the target is attached to the robot arm, and the robot arm is operated using the measurement result of the device to perform the work is known.

A device for measuring the shape of the target projects a bright and dark pattern onto the target and measures the shape of the target by a phase shift method as described in JP-A-2014-89062. Here, the device described in JP-A-2014-89062 projects the bright and dark pattern onto the target by performing scanning with light from a laser light source by a MEMS mirror that swings in a resonance.

In general, a device to be attached to the robot arm limits a movable range of a robot or reduces a loading weight of the robot as the size becomes larger. Therefore, reduction in size is required for the device to be attached to the robot arm.

However, in the device described in JP-A-2014-89062, since the MEMS mirror is resonantly driven, when a resonance frequency of the MEMS mirror changes according to a change in environmental temperature or the like, according to this, a driving frequency of the MEMS mirror should be changed. Therefore, in the device described in JP-A-2014-89062, a circuit for controlling the driving frequency of the MEMS mirror according to the change in resonance frequency is required, the circuit configuration becomes complicated, and as a result, there is a problem that the size of the device increases.

SUMMARY

An advantage of some aspects of the invention is to provide a robot system in which a small device for measuring a shape of a target is provided in a robot arm.

The invention can be implemented as the following application examples or embodiments.

A robot system according to an application example includes: a robot arm which performs work with respect to a target; a shape measurement device which is disposed in the robot arm and measures a shape of the target; and a control unit which controls the robot arm based on a result measured by the shape measurement device, in which the shape measurement device includes a projection device which projects striped pattern light onto the target, a capturing device which captures the pattern light projected onto the target, and a calculation unit (processor) which calculates the shape of the target based on the result of the capturing by the image capturing device, and in which the projection device includes a light source device which emits linear laser, an optical scanner which generates the pattern light by reflecting the laser emitted from the light source device and by scanning the target, and a scanner driver which outputs a driving signal for non-resonantly driving the optical scanner.

According to the robot system, since the optical scanner is non-resonantly driven, even when a change in temperature occurs, it is possible to drive the optical scanner with a stable amplitude and frequency. Therefore, a circuit for reducing a change in characteristics due to the change in temperature is not required, and the size of the shape measurement device can be reduced.

In the robot system according to the application example of the invention, it is preferable that the waveform of the driving signal has a sinusoidal shape.

With this configuration, it becomes easy to generate the driving signal. Further, it is possible to reduce the number of cases where a frequency other than the driving frequency of the optical scanner is included in the frequency components of the driving signal, and to stably perform the non-resonance driving of the optical scanner.

In the robot system according to the application example of the invention, it is preferable that a light source driver which outputs a modulating signal for driving the light source device is further provided, striped pattern light projected onto the target is a stripe pattern that becomes sinusoidal with the brightness and darkness of a luminance value, and a waveform of the modulating signal has a shape different from the sinusoidal shape.

With this configuration, even when the waveform of the driving signal of the optical scanner has a sinusoidal shape, it is possible to project the striped pattern light representing a sinusoidal wave with brightness of darkness of the luminance value with high accuracy.

In the robot system according to the application example of the invention, it is preferable that an automatic transport device which has the robot arm mounted thereon and is movable without a track is further provided.

With this configuration, the robot arm can be moved, and work can be performed over a wide range. In addition, since the automatic transport device can move without a track, equipment, such as a rail for guiding the movement of the automatic transport device becomes unnecessary or simplified, the equipment cost can be reduced.

In the robot system according to the application example of the invention, it is preferable that an environment recognition sensor which recognizes environment in a direction in which the automatic transport device moves is further provided, and the automatic transport device is movable based on a recognition result of the environment recognition sensor.

With this configuration, since the equipment, such as a marker for guiding the movement of the automatic transport device becomes unnecessary or simplified, the equipment cost can be reduced.

In the robot system according to the application example of the invention, it is preferable that the scanner driver stops the output of the driving signal when the shape measurement device is being moved by an operation of the robot arm.

With this configuration, it is possible to reduce damage to the optical scanner due to an impact, such as collision during the operation of the robot arm.

In the robot system according to the application example of the invention, it is preferable that a failure detection unit which detects a failure of the optical scanner is further provided.

With this configuration, it is possible to grasp whether or not the optical scanner fails. Therefore, for example, in a case where the optical scanner fails, by stopping the driving of the light source device, it is possible to prevent high intensity light from the stopped optical scanner from hitting a person and to improve safety.

In the robot system according to the application example of the invention, it is preferable that the optical scanner includes a movable mirror unit, and a pair of shaft portions which support the movable mirror unit for swinging movement, and in which the failure detection sensor has a distortion sensor provided in the shaft portion.

The distortion sensor can be easily manufactured using a semiconductor manufacturing technology. Further, compared to a sensor for detecting other failures, such as an optical sensor, it is possible to reduce the size of the failure detection unit.

In the robot system according to the application example of the invention, it is preferable that the frequency of the driving signal is within a range of 100 Hz to 4 kHz.

With this configuration, it is possible to easily realize the non-resonance driving of the optical scanner while making the measurement accuracy of the shape measurement device excellent.

In the robot system according to the application example of the invention, it is preferable that the robot system which has two robot arms.

With this configuration, a work efficiency can be improved or more complicated work can be performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot system according to the invention will be described in detail based on preferred embodiments illustrated in the attached drawings.

First Embodiment

Figure 1:
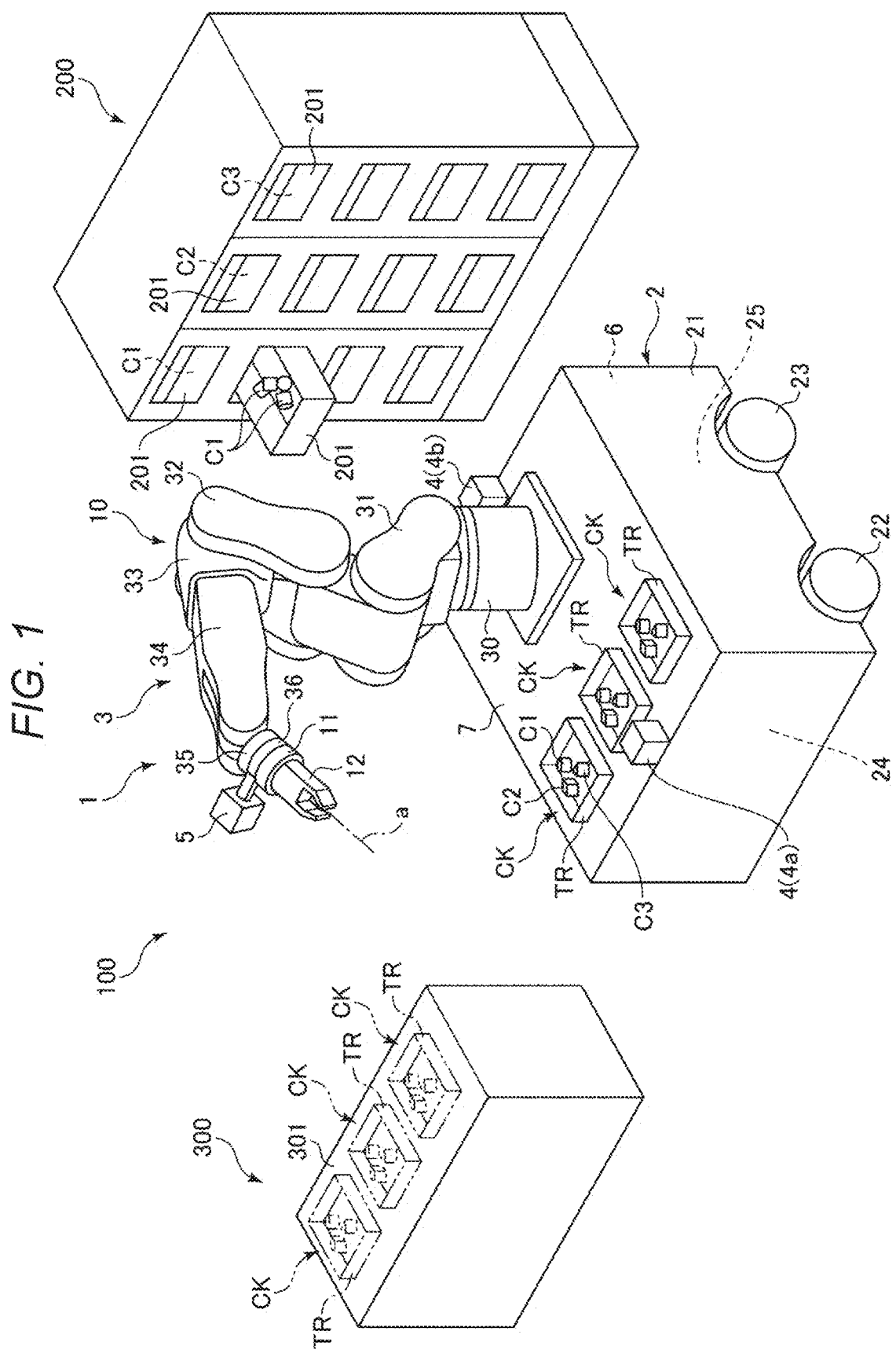
FIG. 1 is a perspective view schematically illustrating a robot system according to a first embodiment of the invention.
Figure 2:
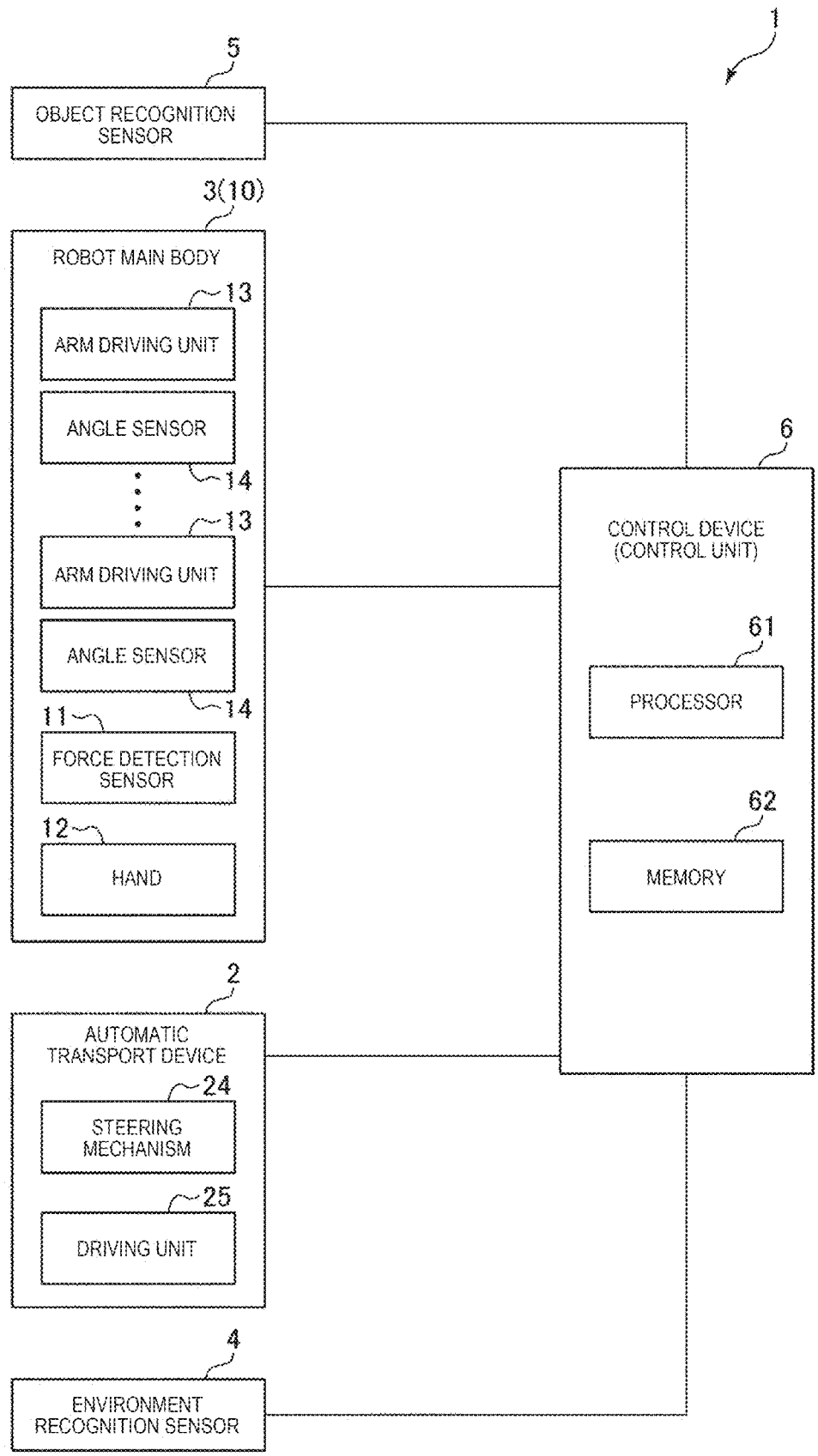
FIG. 2 is a block diagram illustrating a control system of the robot system illustrated in FIG. 1.
Figure 3:
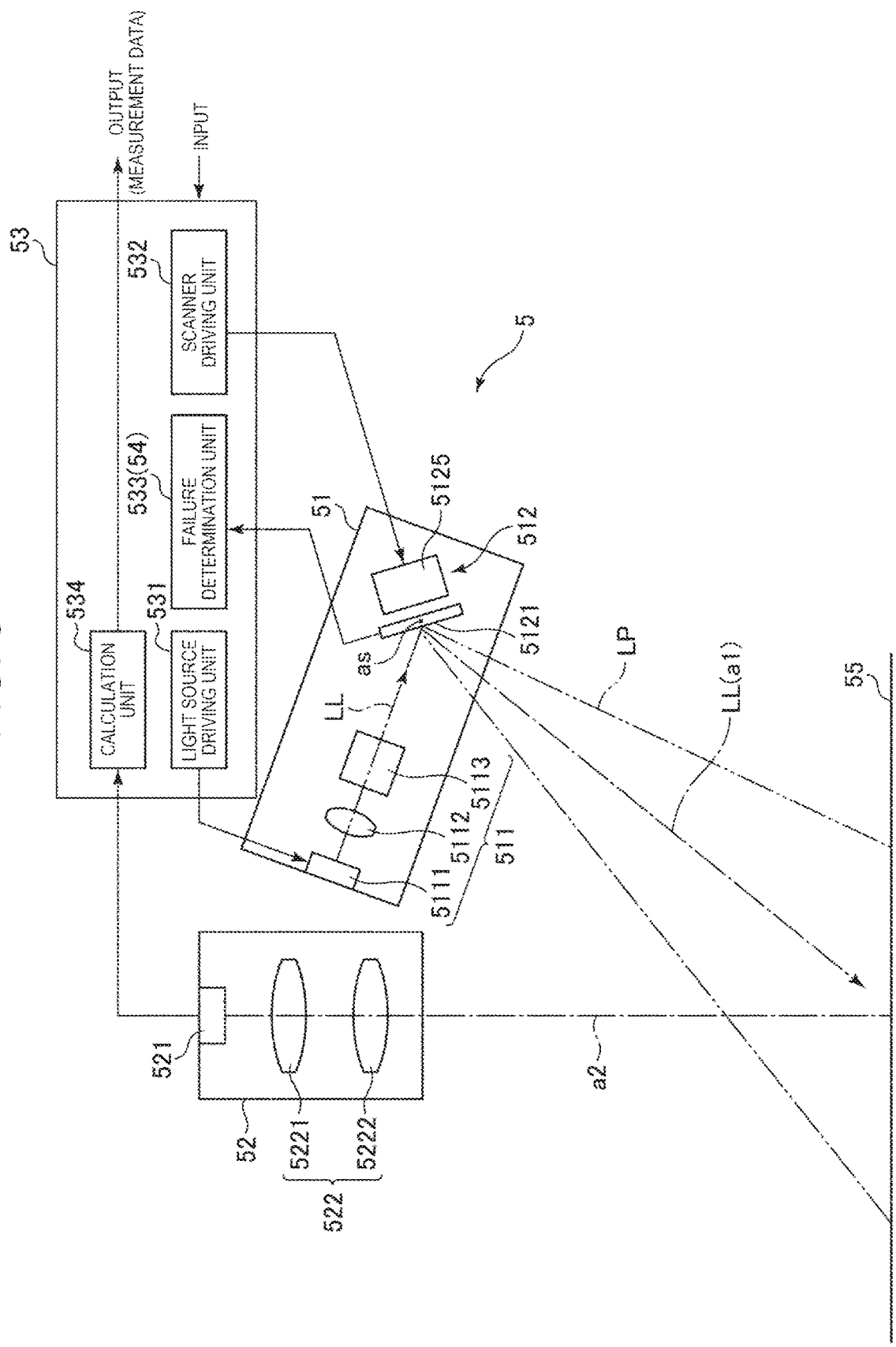
FIG. 3 is a schematic view of an object recognition sensor included in the robot system illustrated in FIG. 1.
Figure 4:
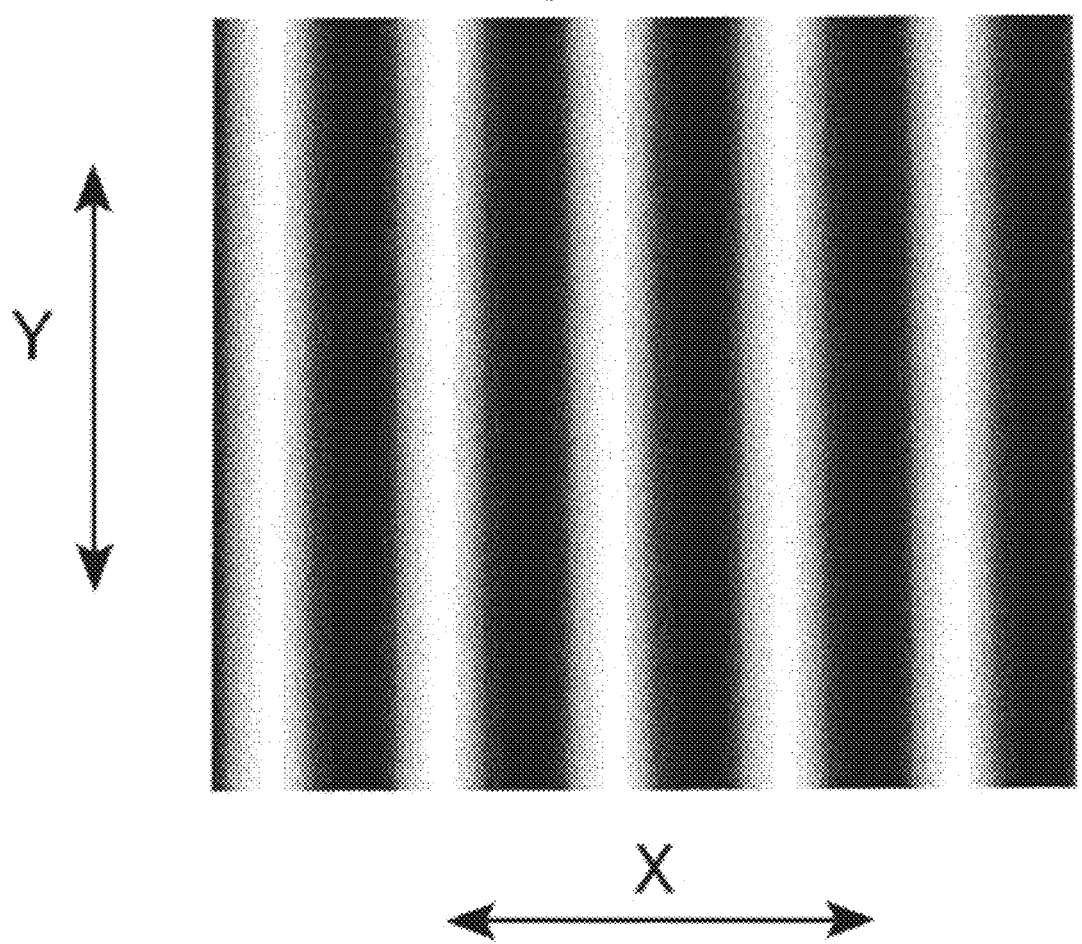
FIG. 4 is a view illustrating a bright and dark state of a projection pattern (pattern light) generated by a projection device included in the object recognition sensor illustrated in FIG. 3.
Figure 5:
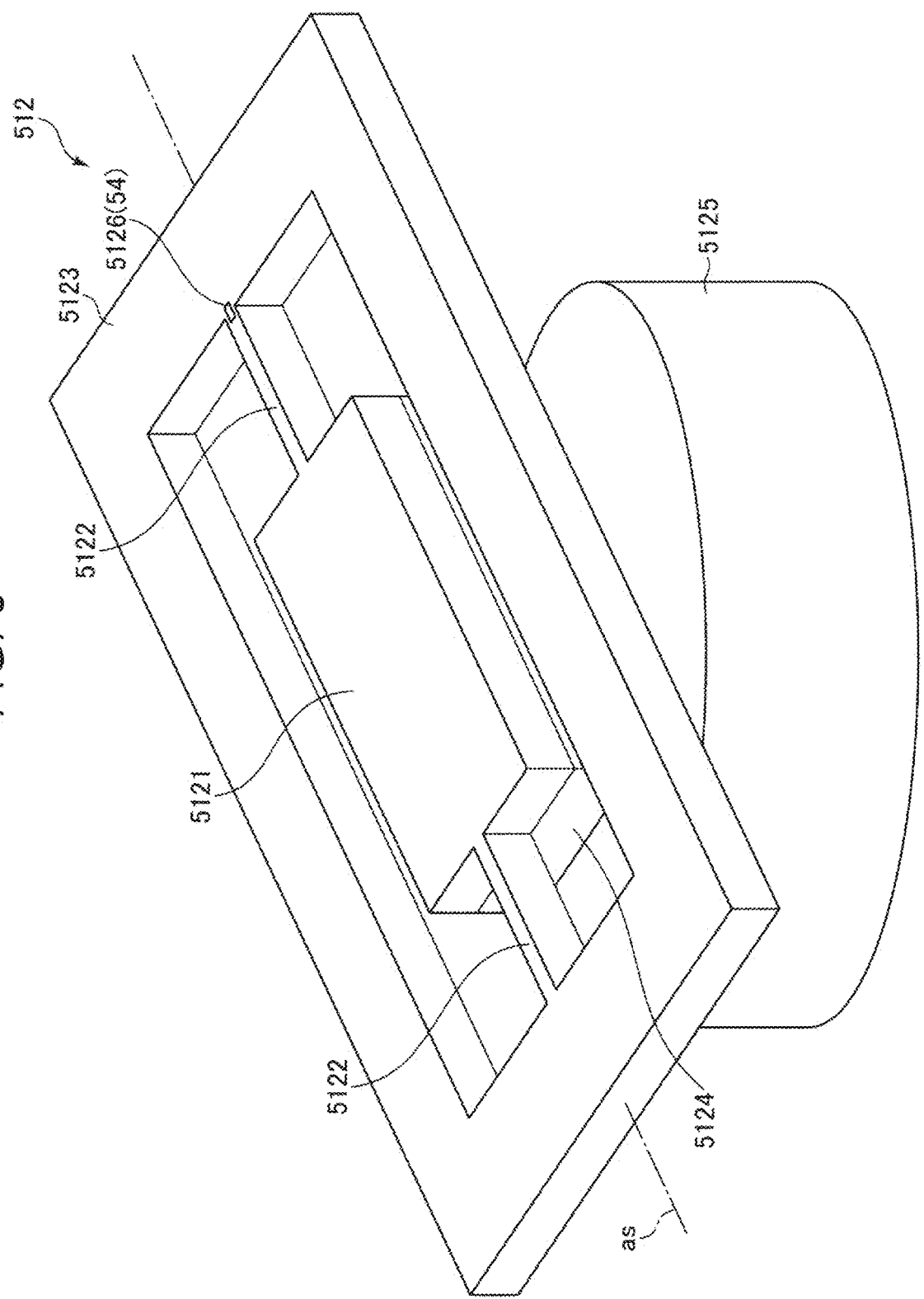
FIG. 5 is a perspective view of an optical scanner included in the object recognition sensor illustrated in FIG. 3.
Figure 6:
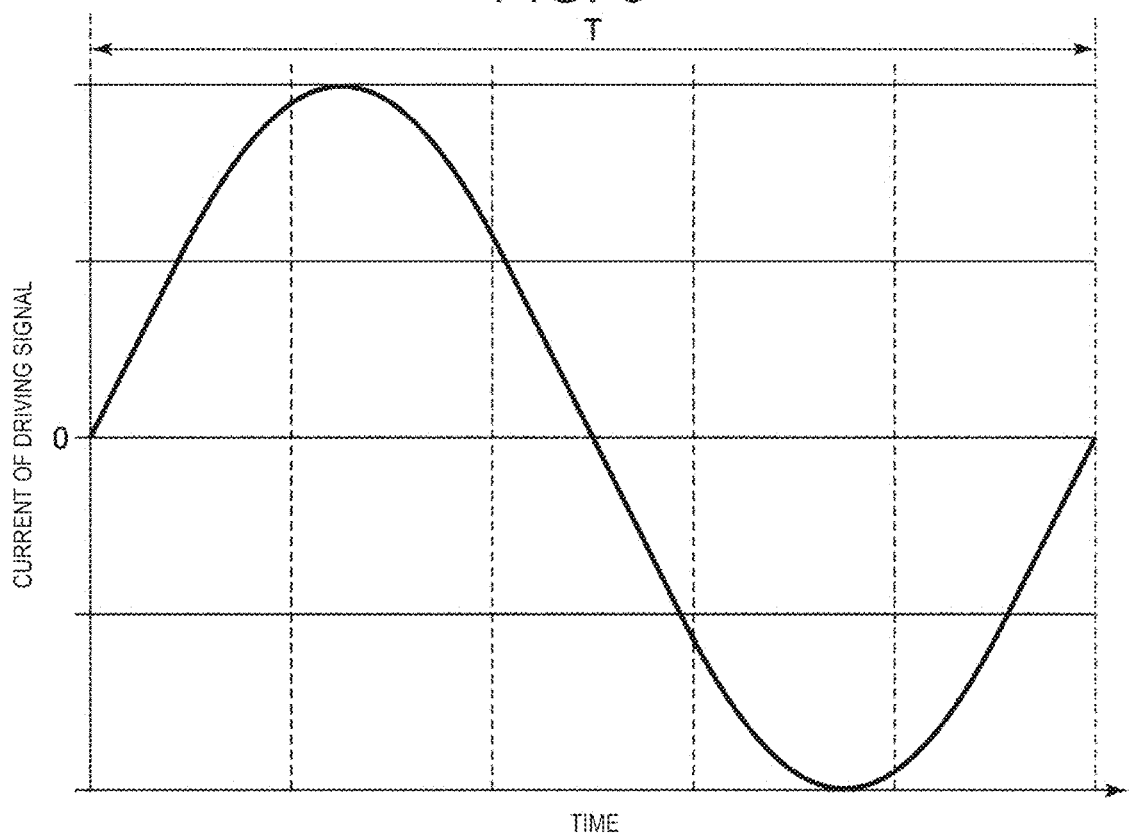
FIG. 6 is a view illustrating a waveform of a driving signal from a scanner driver included in the object recognition sensor illustrated in FIG. 3.
Figure 7:
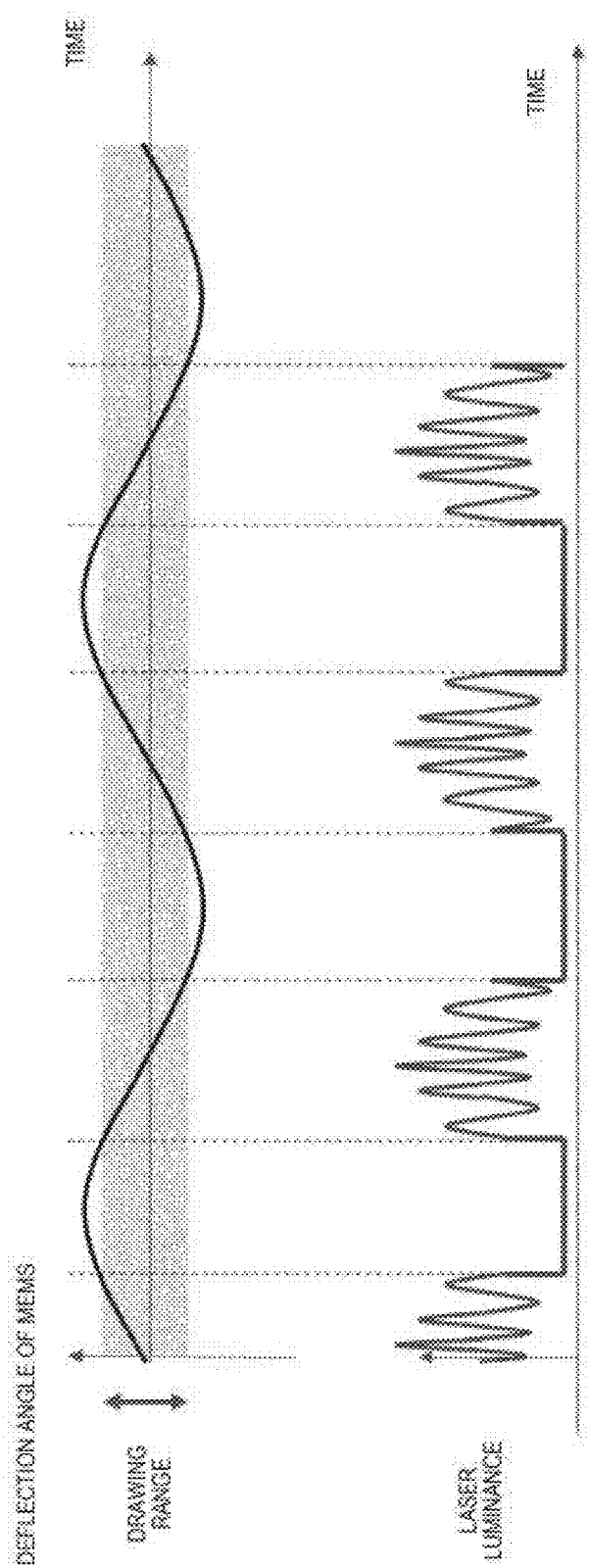
FIG. 7 is a view illustrating a waveform (lower part in the drawing) of a modulating signal output from a light source driver of the object recognition sensor illustrated in FIG. 3, and a deflection angle (upper part in the figure) of a movable mirror unit.

FIG. 1 is a perspective view schematically illustrating a robot system according to a first embodiment of the invention. FIG. 2 is a block diagram illustrating a control system of the robot system illustrated in FIG. 1. FIG. 3 is a schematic view of an object recognition sensor included in the robot system illustrated in FIG. 1. FIG. 4 is a view illustrating a bright and dark state of a projection pattern (pattern light) generated by a projection device included in the object recognition sensor illustrated in FIG. 3. FIG. 5 is a perspective view of an optical scanner included in the object recognition sensor illustrated in FIG. 3. FIG. 6 is a view illustrating a waveform of a driving signal from a scanner driver included in the object recognition sensor illustrated in FIG. 3. FIG. 7 is a view illustrating a waveform (lower part in the drawing) of a modulating signal output from a light source driver of the object recognition sensor illustrated in FIG. 3, and a deflection angle (upper part in the drawing) of a movable mirror unit.

A robot system 100 illustrated in FIG. 1 is a system in which a robot 1 performs work for detaching each type of a plurality of components C1, C2, and C3 different from each other from a component storage unit 200 (component supply unit), creating a component kit CK configured with the plurality of types of components C1, C2, and C3, and supplying the component kit CK to a workbench 300 (next process unit).

The component storage unit 200 is a component shelf having twelve storage spaces by being divided into four stages in a vertical direction and three rows (a left side, the center, and a right side) in a horizontal direction, and in each of the storage spaces, containers 201 are stored. Here, each of the containers 201 has a tray shape or a box shape opened upward. In addition, the plurality of components C1 are stored in each of the containers 201 in a row on the left side of the component storage unit 200. The plurality of components C2 are stored in each of the containers 201 in a row at the center of the component storage unit 200. The plurality of components C3 are stored in each of the containers 201 in a row on the right side of the component storage unit 200. In addition, each of the containers 201 is disposed so as to be capable of being withdrawn from the component storage unit 200. Accordingly, it is possible to easily detach the components C1, C2, and C3 from each of the containers 201.

In addition, the component storage unit 200 is not limited to the number, configuration, disposition, and the like of the illustrated storage spaces, and the component storage unit 200 may be configured with a plurality of independent shelves for each type of components, for example, and in this case, the plurality of shelves may be disposed in any manner. Further, when the components C1, C2, and C3 can be placed in a state where the robot 1 can work, the container 201 may be omitted.

The components C1, C2, and C3 are different types of components. Each of the components C1, C2, and C3 is not particularly limited, but various components can be employed, for example. The component kit CK is configured to include the components C1, C2, and C3 one by one. In addition, the component kit CK may include components other than the components C1, C2, and C3, or may include a plurality of components of the same type.

The workbench 300 is a table for performing work using the component kit CK. The illustrated workbench 300 has a placing unit 301 on which a plurality of component kits CK can be placed. Work on the workbench 300 is not particularly limited, but examples of assembly of component groups including the component kit CK, include painting, surface treatment, arrangement, transport, and the like.

In addition, the workbench 300 is not limited to the configuration and disposition illustrated in the drawing as long as the plurality of component kits CK or trays TR can be placed thereon, and for example, the workbench 300 may be a device, such as a belt conveyor.

The robot system 100 includes: an automatic transport device 2; a robot main body 3 which includes a robot arm 10 mounted on the automatic transport device 2; an environment recognition sensor 4 which is disposed in the automatic transport device 2; an object recognition sensor 5 (shape measurement device) which is disposed in the robot arm 10; a control device 6 (control unit) which controls operations of the automatic transport device 2 and the robot arm 10; and a placing unit 7 which is disposed on the automatic transport device 2, and configures the robot 1 on which the members can travel. In addition, the robot system 100 can also be said to be a system including the robot 1, the component storage unit 200, and the workbench 300.

Here, based on the recognition result (measurement result) of the environment recognition sensor 4, the control device 6 can move the automatic transport device 2 such that the robot arm 10 is in a position at which the work is possible with respect to the component storage unit 200 or the workbench 300. Further, when the robot main body 3 is in the position at which the work is possible with respect to the component storage unit 200, the control device 6 can drive the robot main body 3 to create the plurality of component kits CK on the placing unit 7 based on the recognition result of the object recognition sensor 5. Further, when the robot main body 3 is in the position at which the work is possible with respect to the workbench 300, the control device 6 can drive the robot main body 3 to replace the plurality of component kits CK onto the workbench 300 from above the placing unit 7 based on the recognition result of the object recognition sensor 5.

In this manner, the robot 1 can replace the plurality of component kits CK onto the workbench 300 after creating the component kits CK on the placing unit 7. Accordingly, it is possible to reduce the number of times of reciprocation of the automatic transport device 2 between the component storage unit 200 and the workbench 300, and to improve a work efficiency. In the embodiment, the plurality of trays TR are placed on the placing unit 7 before creating the component kit CK, and the component kit CK is created on the tray TR. In addition, the component kit CK is replaced onto the workbench 300 from above the placing unit 7 for each tray TR. Accordingly, it is possible to simplify replacement work.

Hereinafter, each portion which configures the robot system 100 (robot 1) will be sequentially described below.
Automatic Transport Device The automatic transport device 2 illustrated in FIG. 1 is an unmanned transport vehicle which can travel (move) without a track. Here, the phrase of "capable of traveling (moving) without a track" means that it is possible to control the traveling (moving) so as to be oriented to an indicated target position without equipment, such as a rail that becomes a track for traveling (moving) of the automatic transport device 2 or a guide line for guiding the automatic transport device 2.

As illustrated in FIGS. 1 and 2, the automatic transport device 2 includes: a vehicle body 21; a pair of front wheels 22 which are attached to the vehicle body 21 and are on the front side that is normally on the forward direction side; a pair of rear wheels 23 on the rear side; a steering mechanism 24 which is capable of changing a steering angle of the pair of front wheels 22; and a driver 25 which is capable of driving the pair of rear wheels 23.

As illustrated in FIG. 1, a placing unit 7 which is capable of placing the plurality (three in the drawing) of component kits CK including the plurality of components C1, C2, and C3 are provided on the upper portion of the vehicle body 21. The placing unit 7 is configured to be placed in a state where the component kit CK placed on the tray TR. Here, one component kit CK is placed on one tray TR. Therefore, the placing unit 7 is configured to be capable of placing the plurality (three in the drawing) of trays TR. In addition, the number of trays TR which can be placed on the placing unit 7 is equal to the number of component kits CK that can be placed on the placing unit 7. The trays TR are placed on the placing unit 7 using the robot main body 3 before creating the component kit CK, or are manually placed on the placing unit 7.

In addition, the number of the component kits CK and the number of the trays TR which can be placed on the placing unit 7 are respectively not limited to the illustrated number, but are any number. In addition, the number of trays TR that can be placed on the placing unit 7 may be different from the number of component kits CK that can be placed in the placing unit 7, and for example, the plurality of component kits CK may be placed on one tray TR.

Meanwhile, at the lower part of the vehicle body 21, the pair of left and right front wheels 22 are provided on the front side and the pair of left and right rear wheels 23 are provided on the rear side.

The pair of front wheels 22 are steering wheels and are attached to the vehicle body 21 via the steering mechanism 24 illustrated in FIG. 2. By changing the steering angle of the pair of front wheels 22 by the steering mechanism 24, steering of the automatic transport device 2 is performed. Accordingly, a traveling direction of the vehicle body 21 can be changed. In addition, the pair of rear wheels 23 may be steerable, or all of the pair of front wheels 22 and one pair of rear wheels 23 may be steerable.

Further, the pair of rear wheels 23 are driving wheels, and are attached to the vehicle body 21 via the driver 25. The driver 25 has a driving source (not illustrated), such as a motor, and transmits the driving force of the driving source to the pair of rear wheels 23. Accordingly, the vehicle body 21 can be made to travel forward or rearward. In addition, the pair of front wheels 22 may be steerable, or all of one pair of front wheels 22 and one pair of rear wheels 23 may be steerable.

In addition, a battery (not illustrated) for supplying the electric power to the above-described driving source is disposed in the vehicle body 21, and the battery is also used for driving the robot arm 10, the environment recognition sensor 4, the object recognition sensor 5, and the like.
Robot Main Body The robot main body 3 illustrated in FIG. 1 is a so-called single 6-axis vertical articulated robot. The robot main body 3 includes a base 30 and a robot arm 10 which is rotatably connected to the base 30. In addition, a hand 12 is attached to the robot arm 10 via a force detection sensor 11.

The base 30 is fixed to the upper portion of the vehicle body 21 of the above-described automatic transport device 2 by bolts or the like (not illustrated). In addition, the installation position of the base 30 with respect to the automatic transport device 2 may be any position as long as the robot main body 3 can place each of the plurality of components C1, C2, and C3 on the placing unit 7 of the above-described automatic transport device 2. Further, the base 30 may be configured integrally with the automatic transport device 2.

The robot arm 10 includes: an arm 31 (first arm) which is rotatably connected to the base 30; an arm 32 (second arm) which is rotatably connected to the arm 31; an arm 33 (third arm) which is rotatably connected to the arm 32; an arm 34 (fourth arm) which is rotatably connected to the arm 33; an arm 35 (fifth arm) which is rotatably connected to the arm 34; and an arm 36 (sixth arm) which is rotatably connected to the arm 35.

In each of joint portions of the arms 31 to 36, an arm driving unit 13 illustrated in FIG. 2 is provided, and each of the arms 31 to 36 rotates by the driving of each of the arm driving units 13. Here, each of the arm driving units 13 includes a motor and a speed reducer (not illustrated). As the motor, for example, an AC servo motor, a servo motor, such as a DC servo motor, a piezoelectric motor, or the like can be used. As the speed reducer, for example, a planetary gear type speed reducer, a wave gear type device, or the like can be used. In addition, an angle sensor 14, such as a rotary encoder (refer to FIG. 2) is provided in each of the arm driving units 13, and the angle sensor 14 detects the rotation angle or the rotation axis of the motor or the speed reduction of the arm driving unit 13.

In addition, as illustrated in FIG. 1, the hand 12 is attached to the arm 36 positioned at a distal end portion of the robot arm 10 via the force detection sensor 11.

The force detection sensor 11 is, for example, a six-axis force sensor which is capable of detecting the six-axis component of the external force applied to the force detection sensor 11. Here, the six-axis component is a translational force (shearing force) component in each direction of three mutually orthogonal axes, and a rotational force (moment) component around the axes of each of the three axes. In addition, the number of detection axes of the force detection sensor 11 is not limited to six, and may be, for example, one or more and five or less.

The hand 12 has two fingers capable of gripping each of the components C1, C2, and C3 which are targets of work of the robot system 100. In addition, the number of fingers of the hand 12 is not limited to two, and may be three or more. In addition, depending on the type of the components C1, C2, and C3, an end effector which holds the components C1, C2, and C3 by suction or the like may be used instead of the hand 12.

Environment Recognition Sensor

The environment recognition sensors 4 are respectively provided at the front portion and the rear portion of the vehicle body 21 of the above-described automatic transport device 2. The environment recognition sensor 4 (4a) provided in the front portion of the vehicle body 21 has a function of outputting a signal that corresponds to the existence (distance) of the object (for example, the target, such as the component storage unit 200 or the workbench 300, a wall which is not illustrated, or an obstacle which is not illustrated which becomes an obstacle to traveling or transporting) or the shape of the object which is on the front side with respect to the vehicle body 21. In addition, the environment recognition sensor 4 (4b) provided in the rear portion of the vehicle body 21 has a function of outputting a signal that corresponds to the existence (distance) of the object (for example, the target, such as the component storage unit 200 or the workbench 300, a wall which is not illustrated, or an obstacle which is not illustrated which becomes an obstacle to traveling or transporting) or the shape of the object which is on the rear side with respect to the vehicle body 21.

In addition, the installation positions and the number of installations of the environment recognition sensors 4 are not limited to the positions and the number described above as long as the environment recognition sensor 4 can recognize the range necessary for the traveling and the work of the robot 1, and for example, the recognition sensor 4b may be omitted or the environment recognition sensor 4 may be provided in at least one of the right side portion and the left side portion of the vehicle body 21 in addition to the environment recognition sensors 4a and 4b.

The environment recognition sensor 4 is not particularly limited as long as the environment recognition sensor 4 has the above-described function, and it is possible to use various three-dimensional measuring machines using a time of flight (TOF) method or the like. Further, the environment recognition sensor 4 can be configured in the same manner as the object recognition sensor 5 which will be described later. However, it is preferable that the environment recognition sensor 4 has a wider measurement range (range of measurable region) than the object recognition sensor 5. Accordingly, it is possible to recognize the environment surrounding the robot 1 over a wide range. Therefore, the robot 1 can improve the safety by reducing the required number of installations of the environment recognition sensors 4, and by reducing the dead angle of the environment recognition sensor 4.

In the environment recognition sensor 4, a three-dimensional orthogonal coordinate system for representing the recognition result is set, and the environment recognition sensor 4 can output the coordinate information of the object in the coordinate system as a recognition result. Here, the coordinate system set in the environment recognition sensor 4 can be formed being correlated with a robot coordinate system (a coordinate system used by the control device 6 for drive control of the robot 1) set in the robot 1 in the control device 6.

Object Recognition Sensor

The object recognition sensor 5 is provided in the distal end portion of the robot arm 10 of the above-described robot main body 3. In the drawing, the object recognition sensor 5 is attached to the arm 36 on the most distal end side among the arms 31 to 36 of the robot arm 10. The object recognition sensor 5 has a function of outputting a signal that corresponds to the shape of the object (for example, a target, such as the components C1, C2, and C3, the component storage unit 200, the workbench 300, and the placing unit 7) around or near the distal end portion of the robot arm 10.

In addition, the installation position of the object recognition sensor 5 may be the other arms 31 to 35, the base 30, or the vehicle body 21 of the automatic transport device 2. Further, the number of installations of the object recognition sensors 5 may be two or more.

The object recognition sensor 5 is configured to measure the shape of the object (target) around or near the distal end portion of the robot arm 10, for example, by using a phase shift method. In other words, the target to which the shape measurement is performed by the object recognition sensor 5 is the target on which the robot arm 10 operates. In addition, in the object recognition sensor 5, a three-dimensional orthogonal coordinate system for representing the recognition result is set, and the object recognition sensor 5 outputs the coordinate information of the object in the coordinate system as a recognition result. Here, the coordinate system set in the object recognition sensor 5 can be formed being correlated with the robot coordinate system (a coordinate system used by the control device 6 for drive control of the robot 1) set in the robot 1 in the control device 6.

Specifically, as illustrated in FIG. 3, the object recognition sensor 5 includes a projection device 51 which projects pattern light LP in a measurement range, an image device 52 which captures the measurement range, and a circuit unit 53 which is electrically connected to each of the projection device 51 and the image capturing device 52.

The projection device 51 has a function of projecting the pattern light LP which is video light of a stripe pattern representing a sinusoidal wave with brightness and darkness of the luminance value in the measurement range. As illustrated in FIG. 4, the pattern light LP divides the measurement range into n sections (preferably within a range of 5 to 50, and is divided into 5 sections in FIG. 4) in a predetermined direction, and the luminance value changes along the sinusoidal wave in the predetermined direction (X direction illustrated in FIG. 4) considering the range of each region as one cycle.

As illustrated in FIG. 3, the projection device 51 includes a light source device 511 which emits linear light LL, and an optical scanner 512 which generates the pattern light LP by performing the scanning while reflecting the light LL from the light source device 511.

The light source device 511 includes alight source 5111 and lenses 5112 and 5113. Here, the light source 5111 is, for example, a semiconductor laser. In addition, the lens 5112 is a collimating lens, and makes the light transmitted through the lens 5112 parallel light. The lens 5113 is a line generator lens (Powell lens), a cylindrical lens, or a rod lens, extends the light from the light source 5111 in a linear shape along the predetermined direction (Y direction illustrated in FIG. 4), and generates the light LL. In addition, the lens 5112 may be provided as necessary, and may be omitted. Instead of the lens 5113, light from the light source 5111 may linearly extend using a concave cylindrical mirror or an optical scanner. Further, in a case where the light from the light source 5111 is in a linear shape, the lens 5113 can be omitted.

The optical scanner 512 is a moving magnet type optical scanner, and generates the pattern light LP by reflecting the linear light LL from the light source device 511 and by performing the scanning in the predetermined direction (X direction illustrated in FIG. 4). As illustrated in FIG. 5, the optical scanner 512 includes a movable mirror unit 5121, a pair of shaft portions 5122, a support unit 5123, a permanent magnet 5124, a coil 5125, and a distortion sensor 5126.

The movable mirror unit 5121 is supported so as to be swingable around a swing axis "as" with respect to the support unit 5123 via the pair of shaft portions 5122 (torsion bars). The movable mirror unit 5121, the shaft portion 5122, and the support unit 5123 are integrally configured of silicon or the like, and can be obtained by, for example, etching a silicon substrate or a silicon on insulator (SOI) substrate.

In addition, one surface (mirror surface) of the movable mirror unit 5121 has light reflectivity and is a part which reflects the light LL from the light source device 511. Here, a metal film may be provided on the one surface as necessary. Further, the movable mirror unit 5121 has an elongated shape along the swing axis as. Accordingly, it is possible to perform the scanning with the linear light LL while reducing the size of the movable mirror unit 5121. In addition, the shape in a plan view of the movable mirror unit 5121 is a quadrangle (rectangle) in the drawing, but not being limited thereto, and the shape may be, for example, an elliptical shape. In addition, the shapes of the shaft portion 5122 and the support unit 5123 are not limited to the illustrated shapes either.

The permanent magnet 5124 is bonded (fixed) to the surface opposite to the mirror surface of the movable mirror unit 5121 by an adhesive or the like. The permanent magnet 5124 is, for example, a neodymium magnet, a ferritemagnet, a samarium cobalt magnet, an alnico magnet, or a bonded magnet.

A coil 5125 is disposed immediately below the permanent magnet 5124 (a side opposite to the movable mirror unit 5121). The coil 5125 generates a magnetic field which interacts with the permanent magnet 5124 so as to allow the movable mirror unit 5121 to swing around the swing axis as according to the energization (driving signal) from a scanner driver 532 (refer to FIG. 3) which will be described later. In addition, the disposition or the like of the permanent magnet 5124 and the coil 5125 is not limited to the illustrated disposition or the like as long as the movable mirror unit 5121 can be swung around the swing axis as.

The distortion sensor 5126 is a piezoresistive element provided in a boundary portion between the shaft portion 5122 and the support unit 5123, and a resistance value changes in accordance with the distortion of the shaft portion 5122. When the movable mirror unit 5121 swings (rotates) around the swing axis as, since torsional deformation of the shaft portion 5122 is caused, the distortion generated by the torsional deformation in the shaft portion 5122 can be detected by the distortion sensor 5126, and the movement of the movable mirror unit 5121 can be grasped. The distortion sensor 5126 is obtained by doping silicon which configures the boundary portion between the shaft portion 5122 and the support unit 5123 with an impurity, such as phosphorus or boron.

An emission direction (the direction of a center axis a1) of the pattern light LP of the projection device 51 as described above is inclined with respect to the direction of the optical axis a2 of the image capturing device 52. Accordingly, it is possible to measure the three-dimensional shape with high accuracy. An inclination angle is preferably within the range of 20° to 40°, and more preferably within the range of 25° to 350°. Accordingly, it is possible to measure the three-dimensional shape with high accuracy while widening the measurable range. When the inclination angle is extremely small, the measurable range widens, but the measurement accuracy in the height direction is lowered. Meanwhile, when the inclination angle is extremely large, the measurement accuracy in the height direction can be enhanced, but the measurable range narrows.

The image capturing device 52 includes an image capturing element 521 having a plurality of pixels and an imaging optical system 522, and the image capturing element 521 captures the pattern light LP projected within the measurement range via the imaging optical system 522.

The image capturing element 521 converts a captured image into electric signals for each pixel and outputs the electric signals. The image capturing element 521 is not particularly limited, but for example, charge coupled devices (CCD) or a complementary metal oxide semiconductor (CMOS) can be employed.

The imaging optical system 522 includes two lenses 5221 and 5222, and forms an image of the pattern light on the object surface within the measurement range on a light receiving surface (sensor surface) of the image capturing element 521. In addition, the number of lenses included in the imaging optical system 522 is not limited to the illustrated number as long as the image capturing element 521 can capture the pattern light, and is any number.

The capturing direction (the direction of the optical axis a2) of the image capturing device 52 is parallel to the central axis a (refer to FIG. 1) of the distal end portion of the robot arm 10. Accordingly, the direction in which the distal end portion of the robot arm 10 is oriented can be set as the measurement range.

As illustrated in FIG. 3, the circuit unit 53 includes: a light source driver 531 which drives the light source device 511 of the projection device 51; a scanner driver 532 which drives the optical scanner 512 of the projection device 51; a failure determination unit 533 which determines whether or not the optical scanner 512 fails; and a calculation unit (processor) 534 which calculates the shape of the object (target) within the measurement range based on a signal from the image capturing element 521 of the capturing device 52. In addition, any one of the circuit unit 53, the light source driver 531, the scanner driver 532, and the failure determination unit 533 is not necessarily provided in the distal end portion of the robot arm 10 as long as the units are connected to be electrically conductible, and for example, may be included in the control device 6 which will be described later or may be disposed in the base 30 of the robot main body 3, outside the vehicle body 21, or the like.

The scanner driver 532 illustrated in FIG. 3 is electrically connected to the coil 5125 of the optical scanner 512. The scanner driver 532 is configured to include the driving circuit for driving the coil 5125, and as illustrated in FIG. 6, the scanner driver 532 generates the driving signal (a driving current obtained by superimposing a modulation current on a bias current) of which the current value changes periodically (period T), and the driving signal is supplied to the coil 5125. The frequency (driving frequency) of the driving signal is deviated from the resonance frequency of a vibration system configured with the movable mirror unit 5121 and the pair of shaft portions 5122 described above. Since the object recognition sensor 5 (circuit unit 53) does not have a circuit for controlling the frequency of the driving signal that corresponds to the resonance frequency of the vibration system described above, the movable mirror unit 5121 is non-resonantly driven. In other words, a circuit for reducing a change in characteristics due to the change in temperature is not required, and the size of the shape measurement device can be reduced. In addition, in a case where the movable mirror unit 5121 is non-resonantly driven, compared to a case where the movable mirror unit 5121 is resonantly driven, there is also an advantage that the activation time of the optical scanner 512 (time required for the movable mirror unit 5121 to have a desired amplitude and frequency from the stopped state) can be shortened.

Here, it is preferable that the frequency of the driving signal has a difference from the resonance frequency of the vibration system including the movable mirror unit 5121 and the pair of shaft portions 5122 such that the gain falls within the range of 0.8 to 1.2. In addition, although the specific frequency of the driving signal is not particularly limited, it is preferable that the frequency is, for example, within the range of 100 Hz to 4 kHz. Accordingly, it is possible to easily realize the non-resonance driving of the optical scanner 512 while making the measurement accuracy of the object recognition sensor 5 (shape measurement device) excellent.

In particular, the driving signal output by the scanner driver 532 has a sinusoidal waveform (refer to FIG. 6). Accordingly, since the frequency component of the driving signal becomes single (driving frequency only), the generation of the driving signal (forming of the waveform) can be simplified. In addition, since the driving signal does not include other frequency components other than the driving frequency, it is possible to reduce the resonance driving of the movable mirror unit 5121 by the other frequency components. As a result, it is possible to stably non-resonantly drive the movable mirror unit 5121.

The light source driver 531 illustrated in FIG. 3 is electrically connected to the light source 5111 of the light source device 511. The light source driver 531 is configured to include the driving circuit for driving the light source 5111, generates the modulating signal (the driving current obtained by superimposing the modulation current on the bias current) of which the current value changes periodically, and supplies the modulating signal to the light source 5111. The modulating signal generated by the light source driver 531 is a signal having a waveform that is substantially a sinusoidal wave.

However, as described above, the driving signal output by the scanner driver 532 is a sinusoidal wave signal (a signal forming a sinusoidal waveform). Therefore, the scanning speed on a projection plane 55 (a plane perpendicular to a line segment connecting the optical scanner 512 and the target of the measurement projection to each other) of the light LL scanned by the optical scanner 512 changes by a swing angle thereof as the movable mirror unit 5121 swings, and is not constant. Therefore, when the modulating signal generated by the light source driver 531 is the sinusoidal wave signal, the projected pattern light LP does not become an intended stripe pattern. Here, in order to correct this, the waveform of the modulating signal generated by the light source driver 531 is deviated from the sinusoidal waveform as illustrated at the lower part of FIG. 7. Accordingly, it is possible to draw the pattern light LP of density (stripe pattern indicating the sinusoidal wave with the brightness and darkness of the luminance value) as illustrated in FIG. 4 described above by the light LL from the optical scanner 512.

In addition, the light source driver 531 is capable of outputting the driving signal of which the phase is deviated by $\pi/2$. Accordingly, it is possible to generate the striped pattern light LP of which the phase is deviated by $\pi/2$.

The failure determination unit 533 illustrated in FIG. 3 is electrically connected to the distortion sensor 5126 (refer to FIG. 5) of the optical scanner 512. Based on the resistance value of the distortion sensor 5126, the failure determination unit 533 determines whether or not the optical scanner 512 fails (not operating normally). For example, the failure determination unit 533 measures the resistance value of the distortion sensor 5126, and when the change (frequency) of the resistance value is not synchronized with the frequency of the driving signal, the failure determination unit 533 determines that the optical scanner 512 fails. Here, the distortion sensor 5126 and the failure determination unit 533 configure a failure detection sensor 54 which detects a failure of the optical scanner 512.

Although not illustrated, the calculation unit 534 illustrated in FIG. 3 includes a processor, such as a central processing unit (CPU), and a memory, such as a read only memory (ROM) and a random access memory (RAM). In addition, the calculation unit (processor) 534 calculates the shape of the target based on a capturing result of the image capturing device 52 by executing a measurement program stored in the memory by a processor.

The object recognition sensor 5 described above projects the pattern light LP from the projection unit 51 toward the measurement range and captures the projected pattern light LP by the image capturing device 52. At this time, for example, the light source driver 531 outputs four driving signals of which the phases are deviated by $\pi/2$, the pattern light LP projected with a phase deviated by $\pi/2$ is projected four times, and for each time, the image capturing device 52 captures the projected pattern light LP. In the luminance values at the same coordinates of the four captured images obtained by the four times of capturing, even when an absolute value changes by a surface state or color of a measurement target at the coordinates, a relative value changes only by a phase difference of the pattern light LP. Accordingly, it is possible to obtain a phase value of the stripe pattern at the coordinates while reducing the influence of ambient light, surface state of the measurement target, or the like.

Here, the phase value is not a continuous value in the captured image, and is first obtained in the range of $-\pi$ to $+\pi$ for each strip of the stripe pattern. In addition, the phase value is phase-linked (phase-connected) so as to have continuous values in the captured image. Accordingly, the shape of the measurement target can be measured based on the phase value.

Control Device

The control device 6 (control unit) illustrated in FIG. 2 has a function of controlling the driving of the automatic transport device 2 and the robot arm 10 based on the recognition results of the environment recognition sensor 4 and the object recognition sensor 5.

The control device 6 includes a processor 61, such as a central processing unit (CPU), and a memory 62 (storage unit), such as a read only memory (ROM) and a random access memory (RAM). In addition, although the control device 6 is disposed in the vehicle body 21 of the automatic transport device 2, not being limited thereto, the control device 6 may be disposed in the base 30 of the robot main body 3, outside the vehicle body 21, or the like.

The memory 62 stores programs for driving and controlling the automatic transport device 2 and the robot arm 10, component shape information on the components C1, C2, and C3 which are targets of the work, and map information of the environment (the environment around the robot 1) in which the robot system 100 is used, therein. Here, the map information includes positional information and shape information of the objects (the component storage unit 200, the workbench 300, and the like) in an environment in which the robot 1 is used.

The processor 61 performs drive control of the automatic transport device 2 and the robot arm 10 by appropriately reading and executing the program and various types of information which are stored in the memory 62.

In the control device 6, the robot coordinate system is set as a coordinate system used by the control device 6 for the drive control of the automatic transport device 2 and the robot arm 10. The robot coordinate system is associated with the coordinate system set in the distal end portion (for example, tool center point) of the robot arm 10. Accordingly, the control device 6 can set the distal end portion of the robot arm 10 or the hand 12 to a desired position and posture. In addition, as described above, the robot coordinate system is also associated with the coordinate system set in the environment recognition sensor 4 and the object recognition sensor 5, and based on the recognition result of the sensors, the desired operations of the automatic transport device 2 and the robot arm 10 can be performed. In addition, the above-described circuit unit 53 may be included or may not be included in the control device 6.

Hereinafter, the drive control of the automatic transport device 2 and the drive control of the robot arm 10 by the control device 6 will be described.

Figure 8:
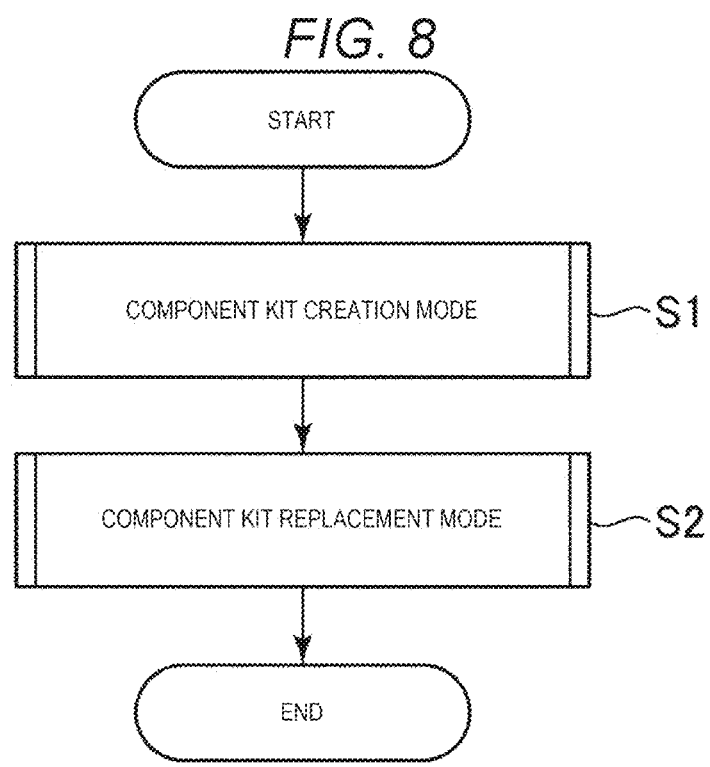
FIG. 8 is a flowchart for describing an operation of the robot system illustrated in FIG. 1.
Figure 9:
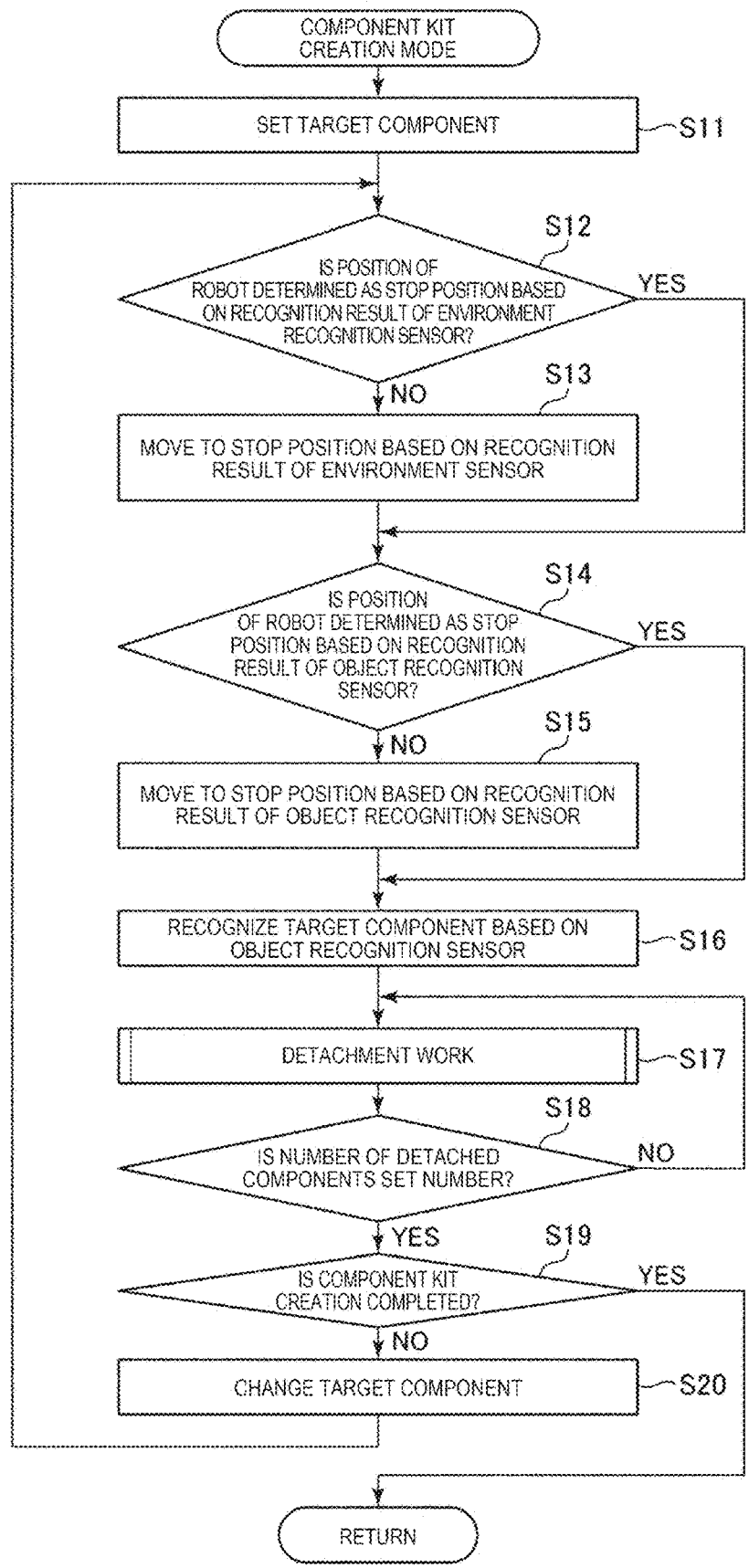
FIG. 9 is a flowchart for describing an operation of a component kit creation mode illustrated in FIG. 8.
Figure 10:
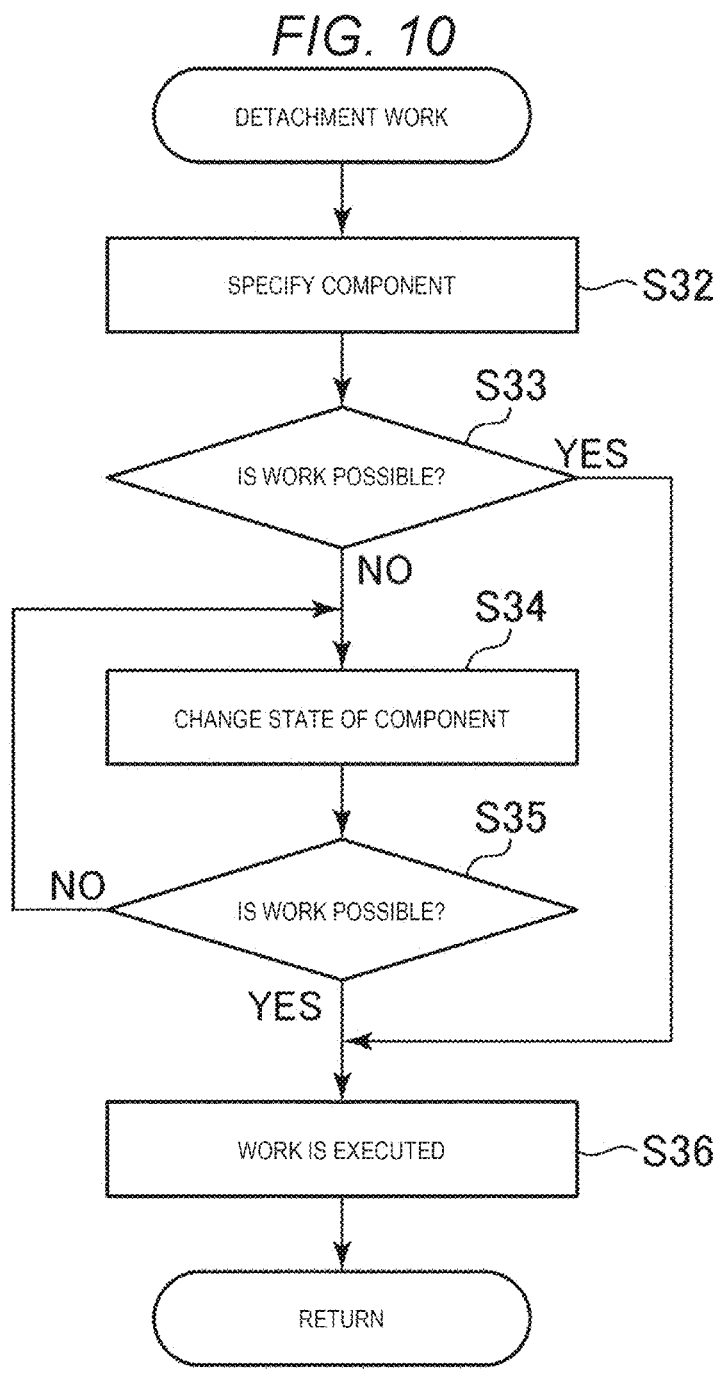
FIG. 10 is a flowchart for describing an operation of detachment work illustrated in FIG. 9.
Figure 11:
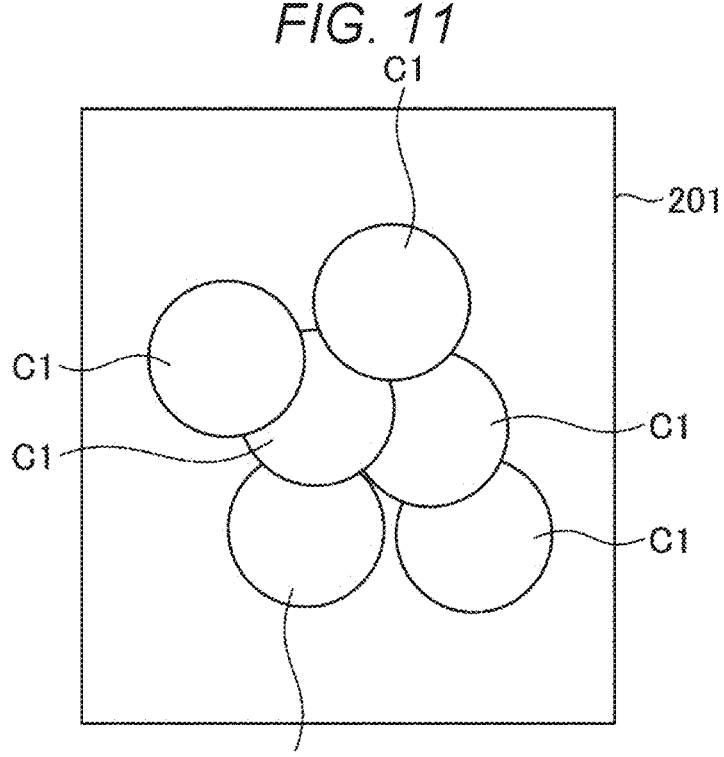
FIG. 11 is a view for describing a case where a component is in a state of not being capable of working.
Figure 12:
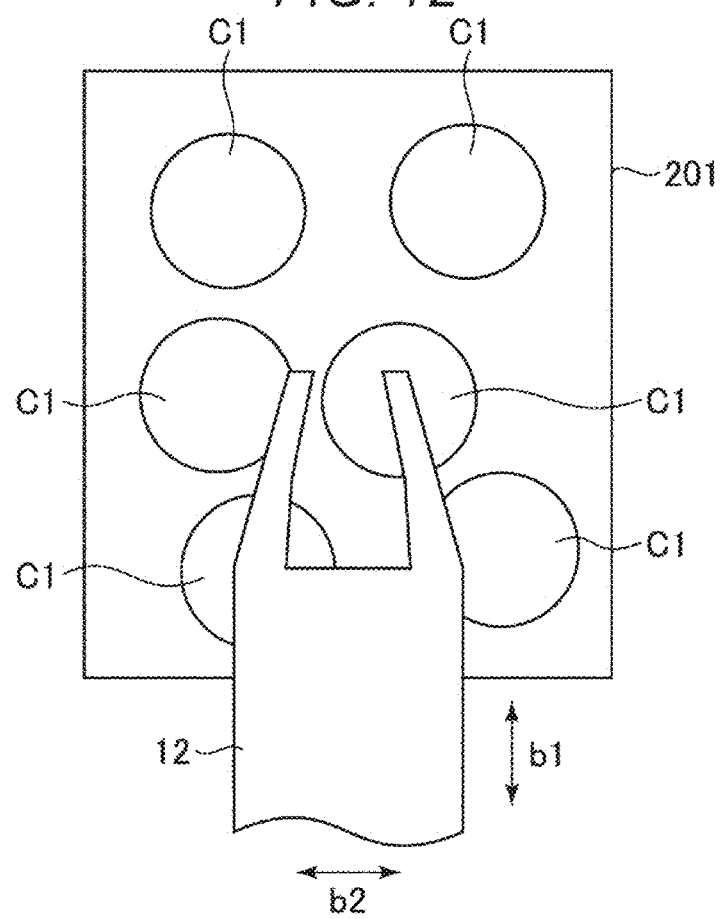
FIG. 12 is a view for describing step S34 illustrated in FIG. 10.
Figure 13:
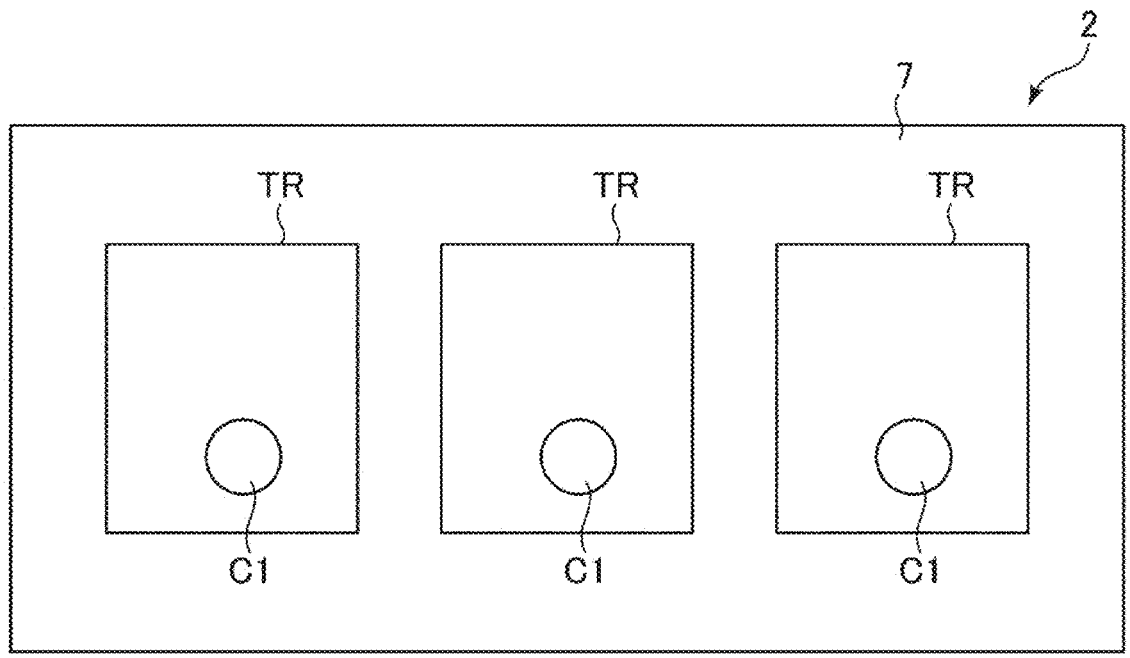
FIG. 13 is a view for describing detachment work of a first type of the component.
Figure 14:
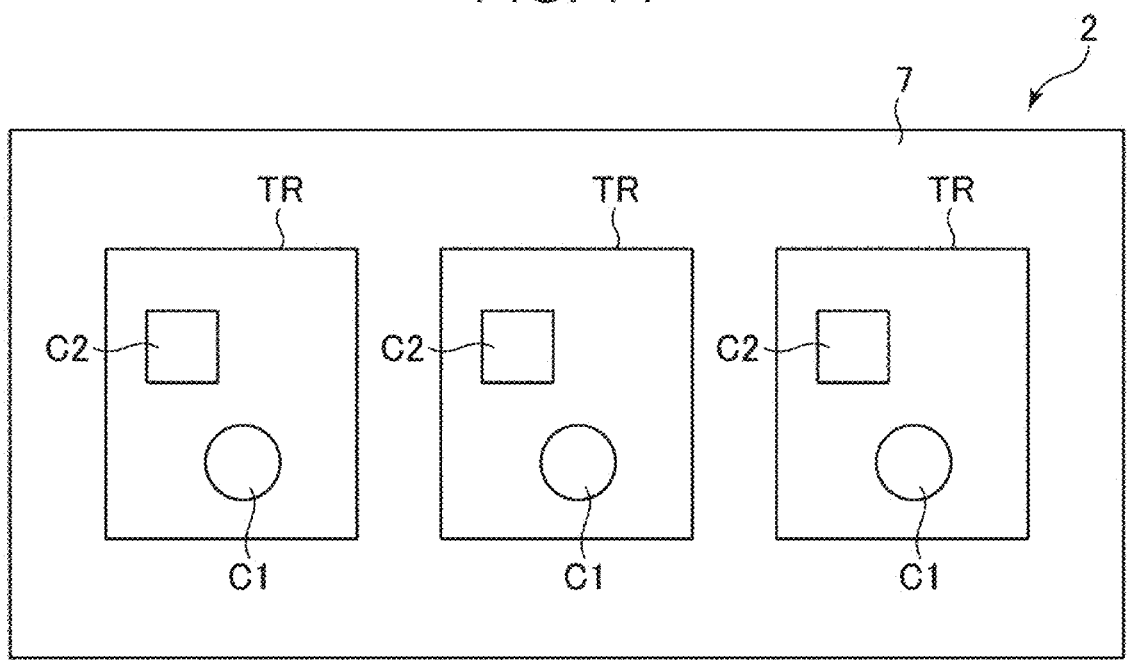
FIG. 14 is a view for describing detachment work of a second type of the component.
Figure 15:
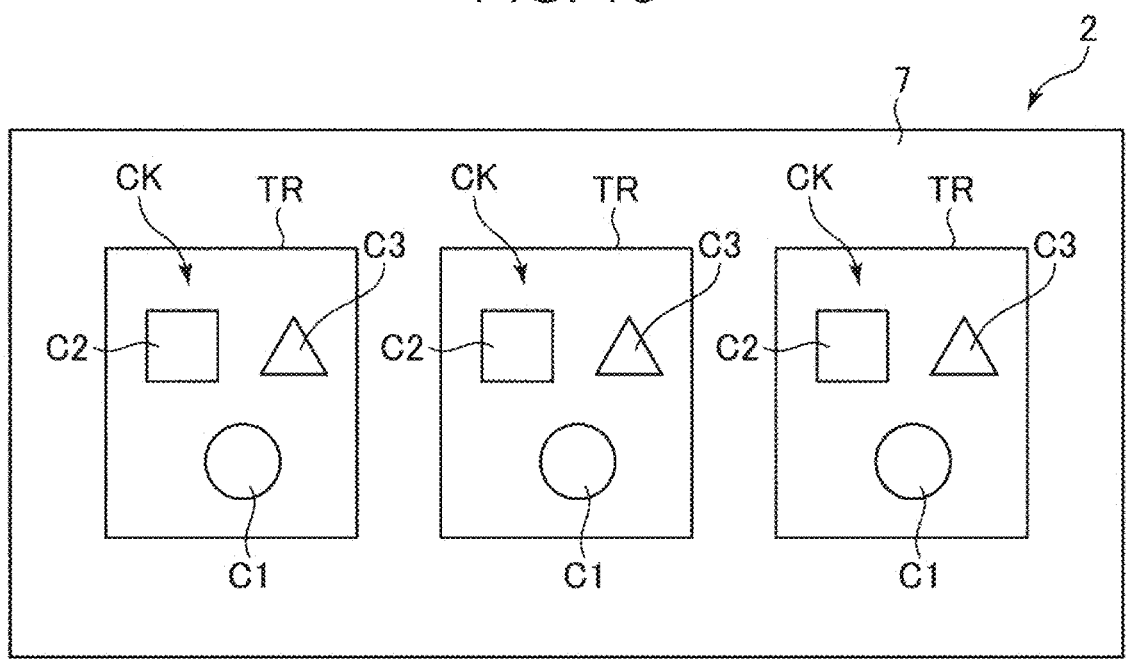
FIG. 15 is a view for describing detachment work of a third type of the component.
Figure 16:
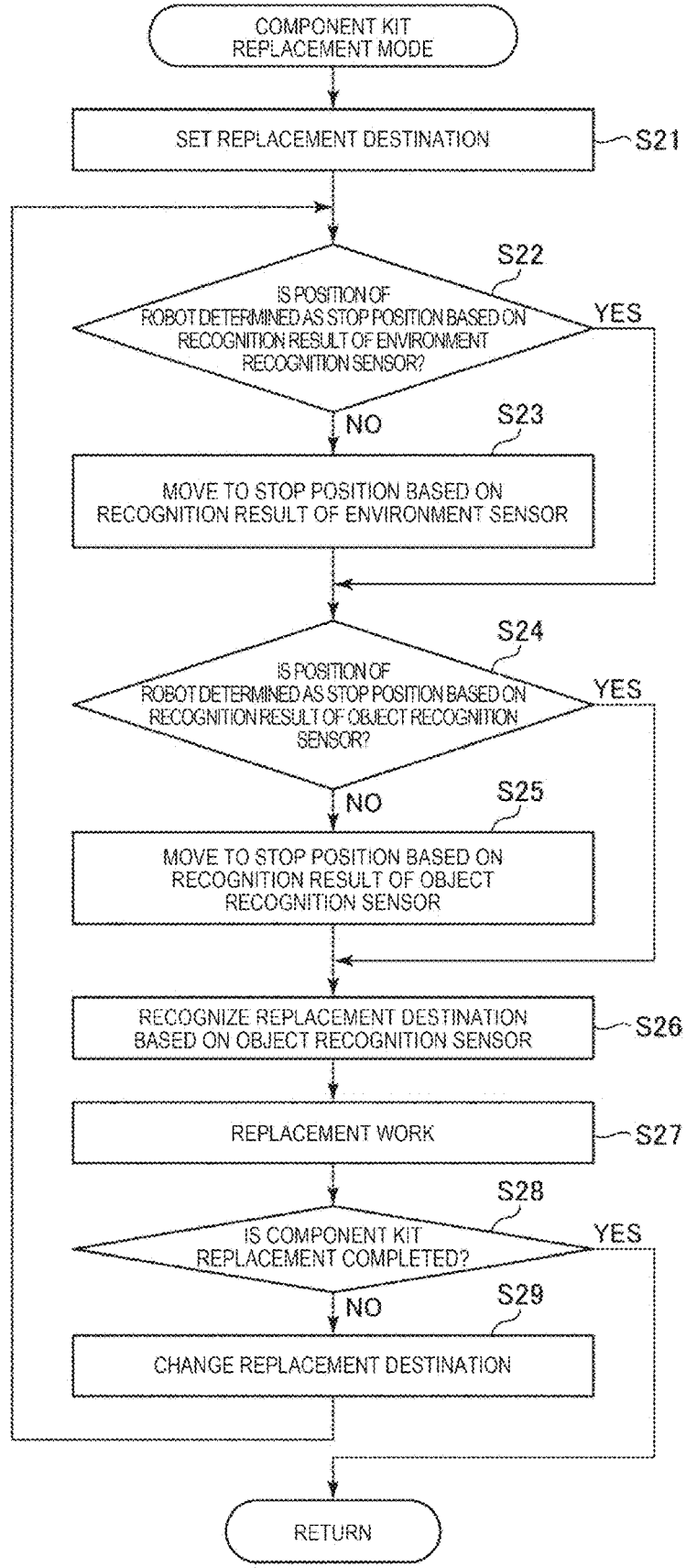
FIG. 16 is a flowchart for describing an operation of a component kit replacement mode illustrated in FIG. 8.
Figure 17:
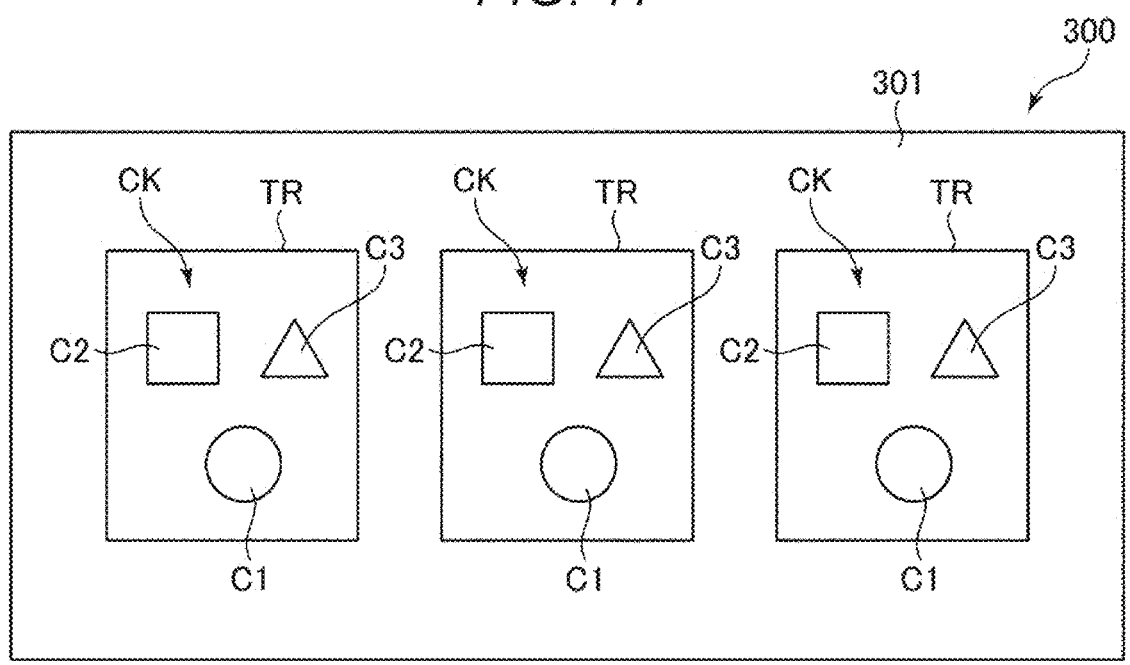
FIG. 17 is a view illustrating a state of a workbench when replacement is completed.

FIG. 8 is a flowchart for describing the operation of the robot system illustrated in FIG. 1. FIG. 9 is a flowchart for describing the operation of a component kit creation mode illustrated in FIG. 8. FIG. 10 is a flowchart for describing the operation of detachment work illustrated in FIG. 9. FIG. 11 is a view for describing a case where the component is in a state of not being capable of working. FIG. 12 is a view for describing step S34 illustrated in FIG. 10. FIG. 13 is a view for describing detachment work of a first type of the component. FIG. 14 is a view for describing detachment work of a second type of the component. FIG. 15 is a view for describing detachment work of a third type of the component. FIG. 16 is a flowchart for describing the operation of a component kit replacement mode illustrated in FIG. 8. FIG. 17 is a view illustrating a state of the workbench when replacement is completed.

As illustrated in FIG. 8, the control device 6 includes the component kit creation mode (step S1) and the component kit replacement mode (step S2), and sequentially executes the modes. Here, the component kit creation mode is a mode in which the plurality of component kits CK are created on the placing unit 7 by detaching the components C1, C2, and C3 from the component storage unit 200. The component kit replacement mode is a mode in which the plurality of component kits CK are replaced onto workbench 300 from above the placing unit 7. Hereinafter, each mode will be described in detail.

Component Kit Creation Mode

In the component kit creation mode, as illustrated in FIG. 9, first, a target component is set (step S11). The target component is one of the components C1, C2, and C3, and for example, the component C1 is set as a target component.

Next, it is determined whether or not the position of the robot 1 (more specifically, the automatic transport device 2) is a stop position based on the recognition result of the environment recognition sensor 4 (step S12). At this time, a current position of the automatic transport device 2 is grasped by collating the map information (particularly, the positional information of the component storage unit 200) stored in the memory 62 with the recognition result of the environment recognition sensor 4. In addition, the current position is compared with the position of the component storage unit 200 in the map information, and it is determined whether or not the current position is the stop position. The stop position is a position at which the robot arm 10 can work with respect to the target component (working position) or a position at which the object recognition sensor 5 can recognize the target position (a position at which the target component exists) of the component storage unit 200.

In a case where the current position of the automatic transport device 2 based on the recognition result of the environment recognition sensor 4 is not the stop position (NO in step S12), the automatic transport device 2 is moved to the stop position based on the recognition result of the environment recognition sensor 4 (step S13). At this time, by using the comparison result in the above-described step S12, a traveling route to the stop position of the automatic transport device 2 may be determined and the driving of the automatic transport device 2 may be controlled based on the traveling route, and the driving of the automatic transport device 2 may be controlled such that the current position of the automatic transport device 2 matches the stop position while collating the map information stored in the memory 62 with the recognition result of the environment recognition sensor 4. After the step S13, the process proceeds to step S14 which will be described later. In addition, it is preferable that the driving of the robot arm 10 is stopped while the automatic transport device 2 is being driven (moving) (the same also during the movement in other steps). Accordingly, for example, it is possible to reduce damage of the object recognition sensor 5 attached to the robot arm 10 due to an impact or the like.

Meanwhile, in a case where the current position of the automatic transport device 2 is the stop position based on the recognition result of the environment recognition sensor 4 (YES in step S12), it is determined whether or not the robot 1 (more specifically, the automatic transport device 2) is the stop position based on the recognition result of the object recognition sensor 5 (step S14). At this time, the current position of the automatic transport device 2 is grasped by collating the map information (particularly, the shape information of the component storage unit 200) stored in the memory 62 with the recognition result of the object recognition sensor 5. In addition, the current position is compared with a work position (for example, a position of the container 201 to be a target of the work) of the component storage unit 200 in the map information, and it is determined whether or not the current position is the stop position. The stop position is a position at which the robot arm 10 can work with respect to the target component.

In a case where the current position of the automatic transport device 2 based on the recognition result of the object recognition sensor 5 is not the stop position (NO in step S14), the automatic transport device 2 is moved to the stop position based on the recognition result of the object recognition sensor 5 (step S15). Accordingly, fine adjustment of the position of the automatic transport device 2 can be performed. At this time, by using the comparison result in the above-described step S14, the traveling route to the stop position of the automatic transport device 2 may be determined and the driving of the automatic transport device 2 may be controlled based on the traveling route, and the driving of the automatic transport device 2 may be controlled such that the current position of the automatic transport device 2 matches the stop position while collating the map information stored in the memory 62 with the recognition result of the object recognition sensor 5. After the step S15, the process proceeds to step S16 which will be described later.

Meanwhile, in a case where the current position of the automatic transport device 2 based on the recognition result of the object recognition sensor 5 is the stop position (YES in step S14), the target component is recognized based on the recognition result of the object recognition sensor 5 (step S16). At this time, the target container 201 is withdrawn using the hand 12. In addition, by collating the shape information stored in the memory 62 (the shape information of the target component among the components C1, C2, and C3) with the recognition result of the object recognition sensor 5, the position and the posture of the target component in the container 201 are grasped.

Next, the detachment work of the target component is performed (step S17). At this time, as illustrated in FIG. 10, first, one component to be detached among the plurality of target components in the container 201 is specified (step S32). In addition, it is determined whether or not the work is possible (step S33). At this time, as illustrated in FIG. 11, in a case where all of the plurality of target components (component C1 illustrated in the drawing) overlap each other, it is determined that the work is not possible.

In a case where it is determined that the work is not possible (NO in step S33), the state of the target component changes (step S34). At this time, as illustrated in FIG. 12, by using the hand 12, the states of the plurality of target components change such that the plurality of target components do not overlap each other. Here, for example, by moving the hand 12 in at least one of a center axis direction b1 and a width direction b2, the work, such as pecking, rolling, and leveling, is performed with respect to at least one target component. The step S34 is repeated until it is determined that the work is possible (NO in step S35).

In a case where it is determined that the work is possible (YES in steps S33 and S35), the work for detaching the target component is executed (step S36). At this time, by collating the shape information stored in the memory 62 (the shape information of the target component among the components C1, C2, and C3) with the recognition result of the object recognition sensor 5, the position and the posture of one specified target component are grasped. In addition, based on the position and the posture, the robot arm 10 and the hand 12 are operated, and the target component is gripped by the hand 12 and placed on the placing unit 7. Further, it is preferable that the driving of the automatic transport device 2 is stopped while the robot arm 10 is being driven (working) (the same also during the replacement work which will be described later). Accordingly, it is possible to improve working accuracy.

The detachment work is repeated until the number of detached components reaches a set number (three in a case of the embodiment) (NO in step S18). By repeating the detachment work in this manner, as illustrated in FIG. 13, the target components (component C1 in the drawing) are placed on each of the trays TR on the placing unit 7. In addition, in a case where the number of detached components reaches the set number, it is determined whether or not the creation of the component kit CK is completed (step S19). At this time, when the component mounted on each of the trays TR is one (refer to FIG. 13) or two (refer to FIG. 14) among the components C1, C2, and C3, it is determined that the creation of the component kit CK is not completed (NO in step S19), the target component changes (step S20). At this time, for example, in a case illustrated in FIG. 13, the target component changes to the component C2, and in a case illustrated in FIG. 14, the target component changes to C3. In addition, the process proceeds to the above-described step S12.

When all of the components C1, C2, and C3 are mounted on each of the trays TR as illustrated in FIG. 15, it is determined that the creation of the component kit CK has been completed (YES in step S19), the component kit creation mode (step S1 illustrated in FIG. 8), and the process proceeds to the component kit replacement mode (step S2 illustrated in FIG. 8).

Component Kit Replacement Mode

In the component kit replacement mode, as illustrated in FIG. 16, first, a replacement destination is set (step S21). The replacement destination is the workbench 300.

Next, it is determined whether or not the position of the robot 1 (more specifically, the automatic transport device 2) is the stop position based on the recognition result of the environment recognition sensor 4 (step S22). At this time, the current position of the automatic transport device 2 is grasped by collating the map information (particularly, the positional information of the workbench 300) stored in the memory 62 with the recognition result of the environment recognition sensor 4. In addition, the current position is compared with the position of the workbench 300 in the map information, and it is determined whether or not the current position is the stop position. The stop position is a position (work position) at which the robot arm 10 can place the component kit CK on the placing unit 301 or a position at which the object recognition sensor 5 can recognize the placing unit 301 of the workbench 300.

In a case where the current position of the automatic transport device 2 is not the stop position based on the recognition result of the environment recognition sensor 4 (NO in step S22), the automatic transport device 2 is moved to the stop position based on the recognition result of the environment recognition sensor 4 (step S23). At this time, by using the comparison result in the above-described step S22, the traveling route to the stop position of the automatic transport device 2 may be determined and the driving of the automatic transport device 2 may be controlled based on the traveling route, and the driving of the automatic transport device 2 may be controlled such that the current position of the automatic transport device 2 matches the stop position while collating the map information stored in the memory 62 with the recognition result of the environment recognition sensor 4. After the step S23, the process proceeds to step S24 which will be described later.

Meanwhile, in a case where the current position of the automatic transport device 2 is the stop position based on the recognition result of the environment recognition sensor 4 (YES in step S22), it is determined whether or not the robot 1 (more specifically, the automatic transport device 2) is the stop position based on the recognition result of the object recognition sensor 5 (step S24). At this time, the current position of the automatic transport device 2 is grasped by collating the map information (particularly, the shape information of the workbench 300) stored in the memory 62 with the recognition result of the object recognition sensor 5. In addition, the current position is compared with a work position (for example, a position of the placing unit 301) of the workbench 300 in the map information, and it is determined whether or not the current position is the stop position. The stop position is a position at which the robot arm 10 can place the component kit CK on the placing unit 301.

In a case where the current position of the automatic transport device 2 is not the stop position based on the recognition result of the object recognition sensor 5 (NO in step S24), the automatic transport device 2 is moved to the stop position based on the recognition result of the object recognition sensor 5 (step S25). Accordingly, fine adjustment of the position of the automatic transport device 2 can be performed. At this time, by using the comparison result in the above-described step S24, the traveling route to the stop position of the automatic transport device 2 may be determined and the driving of the automatic transport device 2 may be controlled based on the traveling route, and the driving of the automatic transport device 2 may be controlled such that the current position of the automatic transport device 2 matches the stop position while collating the map information stored in the memory 62 with the recognition result of the object recognition sensor 5. After the step S25, the process proceeds to step S26 which will be described later.

Meanwhile, in a case where the current position of the automatic transport device 2 based on the recognition result of the object recognition sensor 5 is the stop position (YES in step S24), the placing unit 301 which is at the replacement destination is recognized based on the recognition result of the object recognition sensor 5 (step S26). At this time, the position and the posture of the placing unit 301 are grasped by collating the information (the shape information of the workbench 300) stored in the memory 62 with the recognition result of the object recognition sensor 5.

Next, the replacement work of the component kit CK is performed (step S27). At this time, the tray TR is gripped with the hand 12 and the component kit CK is replaced onto the placing unit 301 from the placing unit 7 for each tray TR. In addition, it is determined whether or not the replacement of the component kit CK has been completed (step S28). It is determined that the replacement of the component kit CK has not been completed (NO in step S28), and the replacement destination changes as necessary (step S29). In addition, the process proceeds to the above-described step S22. Accordingly, as illustrated in FIG. 17, all of the component kits CK can be replaced on the placing unit 301.

It is determined that the replacement of the component kit CK has been completed (YES in step S28), and the component kit replacement mode (step S2 illustrated in FIG. 8) is terminated.

The robot system 100 described above includes: one robot arm 10 which performs the work with respect to the target (components C1, C2, C3, and the like); the object recognition sensor 5 which is disposed in the robot arm 10 and measures the shape of the target; and the control device 6 which is a control unit that controls the robot arm 10 based on the result measured (recognized) by the object recognition sensor 5. The object recognition sensor 5 includes: the projection unit 51 which projects the striped pattern light LP to the target; the image capturing device 52 which captures the pattern light LP; and the calculation unit (processor) 534 which calculates the shape of the target based on the result captured by the image capturing device 52. The projection unit 51 includes: the light source device 511 which emits the light LL that is a linear laser; the optical scanner 512 which generates the patterned light LP by reflecting the light LL from the light source device 511 toward the target and by scanning the target; and the scanner driver 532 which outputs the driving signal for non-resonantly driving the optical scanner 512.

According to the robot system 100, since the optical scanner 512 is non-resonantly driven, even when a change in temperature occurs, it is possible to drive the optical scanner 512 with a stable amplitude and frequency. Therefore, a circuit for reducing a change in characteristics due to the change in temperature is not required, and the size of the object recognition sensor 5 can be reduced. Furthermore, in general, the resonance driving is more power-saving, but in the robot system 100, since the power supply to the object recognition sensor 5 can be received from the robot arm 10, the automatic transport device 2, or the control device 6, while the optical scanner 512 is non-resonantly driven, it is not necessary to have a battery, and thus, this substantially contributes to reducing the size.

Here, the waveform of the driving signal output by the scanner driver 532 is the sinusoidal waveform (refer to FIG. 6). Accordingly, it becomes easy to generate the driving signal. Further, it is possible to reduce the number of cases where the frequency other than the driving frequency of the optical scanner 512 is included in the frequency components of the driving signal, and to stably perform the non-resonance driving of the optical scanner 512.

In addition, it is preferable that the frequency of the driving signal output by the scanner driver 532 is within a range of 100 Hz to 4 kHz. Accordingly, it is possible to easily realize the non-resonance driving of the optical scanner 512 while making the measurement accuracy of the object recognition sensor 5 excellent.

Furthermore, the robot system 100 (more specifically, the object recognition sensor 5) includes the light source driver 531 which outputs the modulating signal for driving the light source device 511, and the waveform of the modulating signal is a waveform (the shape illustrated at the lower part of FIG. 7) different from the sinusoidal waveform (the shape illustrated at the upper part of FIG. 7). Specifically, when the deflection angle of the movable mirror unit 5121 is θ, the driving frequency is f, the maximum amplitude (mechanical angle) is θmax, the distance between the MEMS mirror and the projection surface is h, the time is t, the luminance range is A, and the luminance offset is B, the laser luminance is expressed by the following equation (1).

$$\text{Laser luminance} = \frac{\cos(2\pi ft)}{\cos[2\theta_{max}\sin(2\pi ft)]^2} \{A \sin\{h \cdot \tan[2\theta_{max}\sin(2\pi ft)]\} + B\} \quad (1)$$

Accordingly, even when the speed of the deflection angle of the optical scanner 512 is not constant, it is possible to draw the striped pattern light LP representing the sinusoidal wave with brightness and darkness of the luminance value without luminance nonuniformity within the drawing range.

In the robot system 100, it is preferable that the scanner driver 532 stops the output of the driving signal when the position or pose of the scanner is being moved by an operation of the robot arm 10. Accordingly, it is possible to reduce damage to the optical scanner 512 due to an impact, such as collision during the operation of the robot arm 10.

Further, the object recognition sensor 5 includes the failure detection sensor 54 for detecting a failure of the optical scanner 512. Accordingly, it is possible to grasp whether or not the optical scanner 512 fails. Therefore, for example, in a case where the optical scanner 512 fails, by stopping the driving of the light source device 511, it is possible to prevent high intensity light from the stopped optical scanner 512 from hitting a person and to improve safety.

Here, the optical scanner 512 includes the movable mirror unit 5121, and the pair of shaft portions 5122 which support the movable mirror unit 5121 for swinging movement, and the failure detection sensor 54 has the distortion sensor 5126 provided in the shaft portion 5122. The distortion sensor 5126 can be easily manufactured using a semiconductor manufacturing technology. Further, compared to a sensor for detecting other failures, such as an optical sensor, it is possible to reduce the size of the failure detection sensor 54.

In addition, the robot system 100 includes the automatic transport device 2 which is mounted on the robot arm 10 and can travel without a track. Accordingly, the robot arm 10 can be moved, and the work can be performed over a wide range. In addition, since the automatic transport device 2 can travel without a track, equipment, such as a rail for guiding the traveling of the automatic transport device 2 becomes unnecessary or simplified, the equipment cost can be reduced.

Furthermore, the robot system 100 includes the environment recognition sensor 4 which recognizes the environment in the direction in which the automatic transport device 2 moves, and the automatic transport device 2 can travel based on the recognition result of the environment recognition sensor 4. Accordingly, since equipment, such as a marker for guiding the traveling of the automatic transport device 2 becomes unnecessary or simplified, the equipment cost can be reduced. In addition, in a case where the working range is within the movable range of the robot arm 10, the automatic transport device 2 can be omitted. In this case, the base 30 of the robot main body 3 may be fixed to the floor or the like.

Second Embodiment

Figure 18:
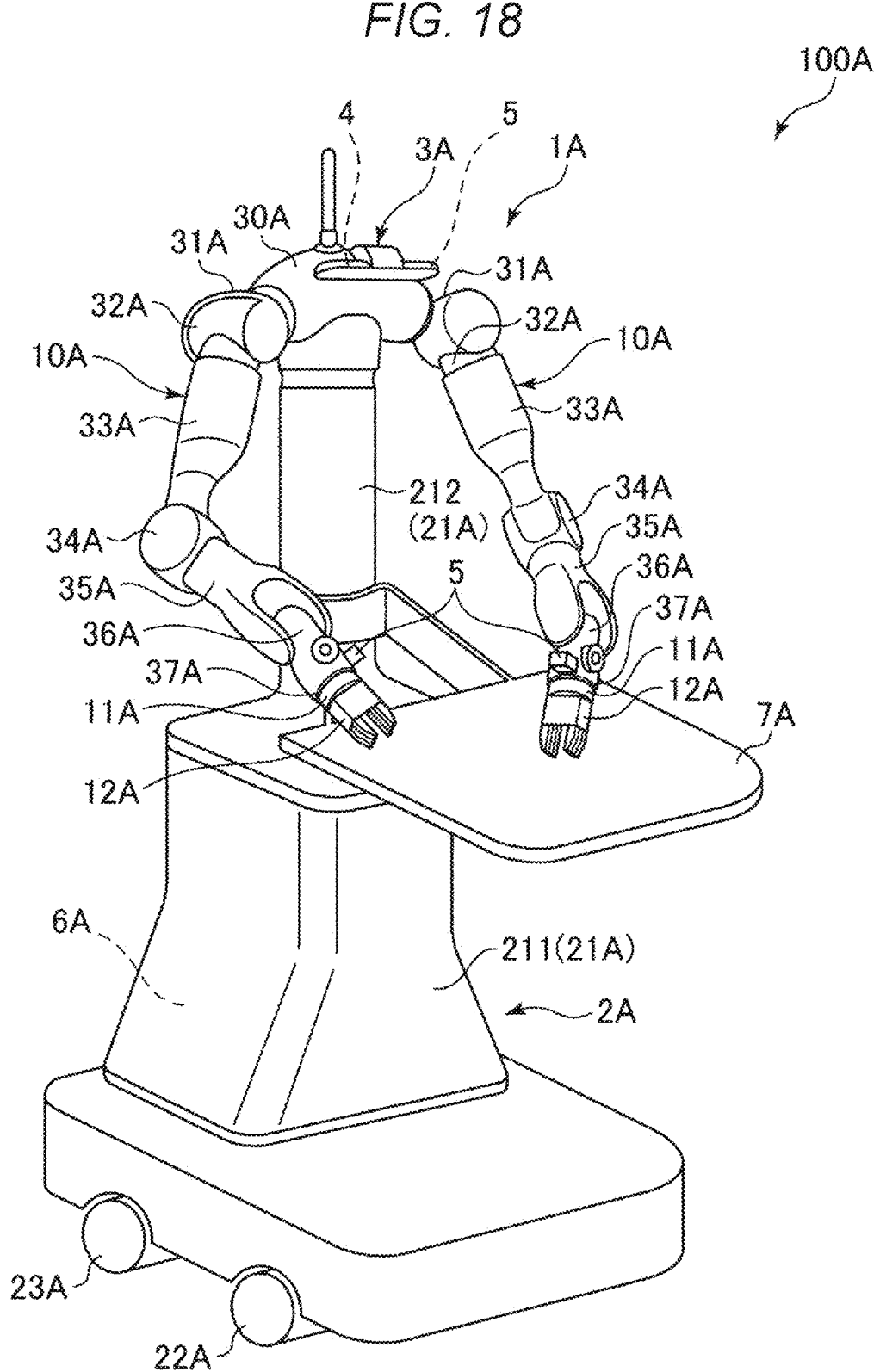
FIG. 18 is a perspective view illustrating a robot used in a robot system according to a second embodiment of the invention.

FIG. 18 is a perspective view illustrating a robot used in a robot system according to a second embodiment of the invention.

The embodiment is the same as the above-described first embodiment except that the invention is applied to a dual arm robot. Hereinafter, the second embodiment will be described focusing on differences from the above-described embodiments, and the description of similar matters will be omitted.

The robot system 100A includes: an automatic transport device 2A; a robot main body 3A which has two robot arms 10A mounted on the automatic transport device 2A; the environment recognition sensor 4 which is disposed in the automatic transport device 2A; the object recognition sensors 5 (shape measurement devices) which are disposed respectively in the automatic transport device 2A and each of the robot arms 10A; a control device 6A (control unit) which controls operations of the automatic transport device 2A and each of the robot arms 10A; and a placing unit 7A disposed in the automatic transport device 2A, and configures a robot 1A on which the members can travel.

The automatic transport device 2A includes: the vehicle body 211; a pair of front wheels 22A and a pair of rear wheels 23A attached to the vehicle body 211; a pillar portion 212 which stands on the vehicle body 211; a steering mechanism (not illustrated) which can change a steering angle of a pair of front wheels 21A; and a driving unit (not illustrated) which is capable of driving the pair of rear wheels 23A. Here, the placing unit 7A which is capable of placing the plurality of component kits CK according to the above-described first embodiment is attached to the pillar portion 212.

The robot main body 3A is a multi-arm robot, and includes a base 30A (body portion) which is connected to the upper portion of the pillar portion 212 of the automatic transport device 2A and two robot arms 10A which are rotatably connected to the left and right sides of the base 30A. In addition, a hand 12A is connected to each of the robot arms 10A via a force detection sensor 11A. Here, on the base 30A, the environment recognition sensor 4 and the object recognition sensor 5 are disposed. In addition, the base 30A is fixedly installed to the automatic transport device 2A and can be said to be a part of the automatic transport device 2A.

Each of the robot arms 10A includes an arm 31A (first arm), an arm 32A (second arm), an arm 33A (third arm), an arm 34A (fourth arm), an arm 35A (fifth arm), an arm 36A (sixth arm), and an arm 37A (seven arm). The arms 31A to 37A are linked to each other in this order from the base end side to the distal end side. In each of the arms 31A to 37A, two adjacent arms are rotatable with each other. Here, the object recognition sensor 5 is disposed in the arm 37A of each of the robot arms 10A.

The control device 6A (control unit) has a function of controlling the driving of the automatic transport device 2A and the robot arm 10A based on the recognition results of the environment recognition sensor 4 and the object recognition sensor 5.

More specifically, based on the recognition result of the environment recognition sensor 4, the control device 6A can move the automatic transport device 2A such that each of the robot arms 10A is in the position at which the work is possible with respect to the component storage unit 200 or the workbench 300 according to the above-described first embodiment. Further, when the robot main body 3A (robot arm 10A) is in the position at which the work is possible with respect to the component storage unit 200, the control device 6A can drive the robot main body 3A to create the plurality of component kits CK on the placing unit 7A based on the recognition result of the object recognition sensor 5. Further, when the robot main body 3A is in the position at which the work is possible with respect to the workbench 300, the control device 6A can drive the robot main body 3A to replace the plurality of component kits CK onto the workbench 300 from above the placing unit 7A based on the recognition result of the object recognition sensor 5. In addition, the object recognition sensor 5 may not be disposed in the base 30A and all of the robot arms 10A, and may be disposed in any one or two of the robot arms.

According to the second embodiment described above, the same effects as those of the above-described first embodiment can be achieved. Further, in the robot system 100A of the embodiment, the number of robot arms 10A is two. Accordingly, a work efficiency can be improved and more complicated work can be performed. In addition, it is possible not only to create the component kit CK on the placing unit 7A, and but also to perform work, such as assembly of the component kits CK on placing unit 7A.

Above, the robot system of the invention is described based on the illustrated embodiments, but the invention is not limited thereto, and the configurations of each part can be replaced with any configuration having similar functions. In addition, any other configurations may be added to the invention.

Further, the invention may be a combination of any two or more configurations (features) of the above-described embodiments.

In the above-described embodiments, a case where the component kit CK including three types of component C1, C2, and C3 one by one is created has been described as an example, but the number and the type of the components which configure the component kit CK are not limited thereto, and for example, the number of components included in the component kit CK may be two, four or more, and the component kit CK may include the plurality of components of the same type.

In addition, the number of arms (the number of joints) included in the robot arm is not limited to the number (6 or 7) of the above-described embodiments, and may be 1 to 5, or 8 or more.

Further, in the above-described embodiments, a case where the optical scanner used for the object recognition sensor is a moving magnet type has been described as an example, but the driving method of the optical scanner is not limited thereto, and a moving coil method, an electrostatic driving method, and a piezoelectric drive system or the like, may be employed.

In the above-described embodiments, a case where the automatic transport device having the robot arm mounted thereon travels based on the recognition result of the environment recognition sensor or the like has been described as an example, but the traveling of the automatic transport device is not limited thereto, and may be performed in accordance with a preset program or may be performed by remote control by an operator.

The entire disclosure of Japanese Patent Application No. 2017-186529, filed Sep. 27, 2017 is expressly incorporated by reference herein.

What is claimed is:

1. A robot system comprising:
   a robot arm which performs work on a target;
   a shape measurement device which is disposed on the robot arm and measures a shape of the target; and
   a controller which controls the robot arm based on a result measured by the shape measurement device,
   wherein the shape measurement device includes a projection device which projects striped pattern light onto the target, an image capturing device which captures the images of the pattern light projected onto the target, and a processor which calculates the shape of the target based on the result of the image captured by the image capturing device, and
   wherein the projection device includes a light source device which emits a linear laser, an optical scanner which generates the pattern light by reflecting the linear laser emitted from the light source device and by scanning the target, and a scanner driver which outputs a driving signal to drive the optical scanner non-resonantly.

2. The robot system according to claim 1,
   wherein the scanner driver outputs the driving signal having a sinusoidal waveform.

3. The robot system according to claim 2, further comprising:
   a light source driver which outputs a modulating signal for driving the light source device,
   wherein the projection device projects a stripe pattern which has a sinusoidal shape with brightness and darkness of a luminance value as a striped pattern light onto the target,
   wherein the light source driver outputs the modulating signal of a waveform having a shape different from the sinusoidal shape.

4. The robot system according to claim 1, further comprising:
   an automatic transport device which has the robot arm mounted thereon and moves without a track.

5. The robot system according to claim 4, further comprising:
   an environment recognition sensor which recognizes an environment in a direction in which the automatic transport device moves,
   wherein the automatic transport device moves based on a recognition result of the environment recognition sensor.

6. The robot system according to claim 1,
   wherein the scanner driver stops the output of the driving signal when the shape measurement device is being moved by an operation of the robot arm.

7. The robot system according to claim 1, further comprising:
   a failure detection sensor which detects a failure of the optical scanner.

8. The robot system according to claim 7,
   wherein the optical scanner includes a movable mirror, and a pair of shaft portions which support the movable mirror for swinging movement, wherein the failure detection sensor has a distortion sensor provided in the shaft portion.

9. The robot system according to claim 1,
wherein the scanner driver outputs the driving signal of which a frequency is within a range of 100 Hz to 4 kHz.

10. The robot system according to claim 1,
wherein a number of robot arms is two.

* * * * *